(12) United States Patent
Rasmussen

(10) Patent No.: US 7,820,271 B2
(45) Date of Patent: *Oct. 26, 2010

(54) LAMINATES OF FILMS AND METHODS AND APPARATUS FOR THEIR MANUFACTURE

(76) Inventor: Ole-Bendt Rasmussen, Sagenstrasse 12, CH-6316 Walchwil/Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,257

(22) Filed: Jul. 19, 2006

(65) Prior Publication Data
US 2007/0254120 A1 Nov. 1, 2007

Related U.S. Application Data

(63) Continuation of application No. 10/480,785, filed as application No. PCT/EP02/07264 on Jun. 14, 2002, now Pat. No. 7,132,151.

(30) Foreign Application Priority Data
Jun. 15, 2001 (GB) .................... 0114691.9

(51) Int. Cl.
*B29D 22/00* (2006.01)
*B32B 3/28* (2006.01)
*B65D 81/02* (2006.01)
*B65D 81/03* (2006.01)
*A41D 3/04* (2006.01)

(52) U.S. Cl. ............ 428/182; 428/35.2; 428/212; 229/87.02; 206/521; 2/87

(58) Field of Classification Search .......... 428/156, 428/182, 183, 212, 35.2; 229/87.02; 206/521; 2/87
See application file for complete search history.

(56) References Cited
U.S. PATENT DOCUMENTS

| 3,954,933 A | 5/1976 | Rasmussen |
| 4,039,364 A | 8/1977 | Rasmussen |
| 4,084,028 A | 4/1978 | Rasmussen |
| 4,115,502 A | 9/1978 | Rasmussen |

(Continued)

FOREIGN PATENT DOCUMENTS

JP 08-299385 * 11/1996

(Continued)

OTHER PUBLICATIONS

PCT International Search Report, Dec. 2002.

*Primary Examiner*—Donald Loney
(74) *Attorney, Agent, or Firm*—Robert W Strozier

(57) ABSTRACT

A laminate of thermoplastic polymeric films comprises a fluted ply A and non-fluted ply B, adhered to one another in bonded zones along some of the flute crests the fluted ply A. The wavelength of the flutes is preferably no more than 3 mm. Ply A has a generally uniform thickness or can have attenuated zones of lesser thickness extending parallel to the flute direction, each bonded zone being located mainly within an attenuated zone. The flutes can be sinuous with crests on both sides of ply A and can be adhered on each side to a ply B. The flutes can be filled with filler material, including reinforcement strands, and one or both sides can be perforated. The method and apparatus employ aligned grooved fluting rollers and a grooved laminating roller.

39 Claims, 9 Drawing Sheets

U.S. PATENT DOCUMENTS

| | | |
|---|---|---|
| 4,125,581 A | 11/1978 | Rasmussen |
| 4,132,581 A | 1/1979 | Swartz ....................... 156/208 |
| 4,143,195 A | 3/1979 | Rasmussen |
| 4,207,045 A | 6/1980 | Rasmussen |
| 4,229,394 A | 10/1980 | Rasmussen |
| 4,267,223 A * | 5/1981 | Swartz ....................... 428/172 |
| 4,293,294 A | 10/1981 | Rasmussen |
| 4,294,638 A | 10/1981 | Rasmussen |
| 4,368,017 A | 1/1983 | Rasmussen |
| 4,377,544 A | 3/1983 | Rasmussen |
| 4,403,934 A | 9/1983 | Rasmussen |
| 4,407,877 A | 10/1983 | Rasmussen |
| 4,420,451 A | 12/1983 | Rasmussen |
| 4,421,810 A | 12/1983 | Rasmussen |
| 4,422,837 A | 12/1983 | Rasmussen |
| 4,430,284 A | 2/1984 | Rasmussen |
| 4,436,568 A | 3/1984 | Rasmussen |
| 4,440,709 A | 4/1984 | Rasmussen |
| 4,465,724 A | 8/1984 | Rasmussen |
| 4,492,549 A | 1/1985 | Rasmussen |
| 4,629,525 A | 12/1986 | Rasmussen |
| 4,636,417 A | 1/1987 | Rasmussen |
| 4,767,488 A | 8/1988 | Rasmussen |
| 4,793,885 A | 12/1988 | Rasmussen |
| 4,874,653 A | 10/1989 | Rasmussen |
| 4,908,253 A | 3/1990 | Rasmussen |
| 5,028,289 A * | 7/1991 | Rasmussen ................ 156/229 |
| 5,205,650 A | 4/1993 | Rasmussen |
| 5,248,366 A | 9/1993 | Rasmussen |
| 5,330,133 A | 7/1994 | Rasmussen |
| 5,361,469 A | 11/1994 | Rasmussen |
| 5,626,944 A | 5/1997 | Rasmussen |
| 5,670,238 A * | 9/1997 | Earl et al. ................... 428/182 |
| 6,139,938 A * | 10/2000 | Lingle et al. ................ 428/182 |
| 6,344,258 B1 | 2/2002 | Rasmussen |
| 6,787,206 B2 | 9/2004 | Rasmussen |
| 6,887,503 B1 | 5/2005 | Rasmussen |
| 7,001,547 B2 | 2/2006 | Rasmussen |
| 7,132,151 B2 * | 11/2006 | Rasmussen ................. 428/182 |
| 2004/0070105 A1 | 4/2004 | Rasmussen |
| 2004/0247730 A1 | 12/2004 | Rasmussen |
| 2005/0095411 A1 | 5/2005 | Rasmussen |
| 2005/0118304 A1 | 6/2005 | Rasmussen |
| 2007/0082188 A1 | 4/2007 | Rasmussen |
| 2007/0254120 A1 | 11/2007 | Rasmussen |
| 2007/0257402 A1 | 11/2007 | Rasmussen |
| 2007/0290416 A1 | 12/2007 | Rasmussen |
| 2008/0035714 A1 | 2/2008 | Rasmussen |
| 2009/0206510 A1 | 8/2009 | Rasmussen |
| 2009/0233041 A1 | 9/2009 | Rasmussen |

FOREIGN PATENT DOCUMENTS

| | | |
|---|---|---|
| WO | WO9405489 A | 3/1994 |

* cited by examiner

Flute - direction

Flute - direction

LAMINATES OF FILMS AND METHODS AND APPARATUS FOR THEIR MANUFACTURE

This application is a continuation of and claims prior to U.S. patent application Ser. No. 10/480,785 filed Dec. 15, 2003, now U.S. Pat. No. 7,132,151, issued 7 Nov. 2006, which is a Nationalization of PCT/EP02/07264 filed Jun. 14, 2002.

The present invention relates to a flexible laminate of films from thermoplastic polymer material for applications in which relatively high yield strength and ultimate tensile strength is required, and a method and apparatus for its manufacture.

Examples of such applications are: tarpaulins, pondliners, substitute of geotextiles, weather protective laminates, greenhouse film, industrial bags, carrier bags and self-standing pouches.

For economical reasons there is an increasing need to reduce the thickness or square meter weight of flexible film made from thermoplastic polymer material. The limits are partly set by the required strength properties, and partly by the required self supporting capability, i.e. stiffness with respect to banding. These needs have mainly been met by selected developments of the thermoplastic polymer compositions and as far as the strength is concerned also by biaxial orientation, or by cross-lamination of films each of which exhibits a generally monaxial or unbalanced biaxial orientation.

From strength point of view essential savings can be achieved by such orientation and/or cross-lamination 25 processes.

Thus as an example an industrial bag made from extruded polyethylene film of the best suited grades and destined for packing of 25 kg polyethylene granules must generally have a thickness of 0.12-0.15 mm in order to satisfy the normal strength requirements, while this thickness can be brought down to about 0.07 mm by use of optimized oriented and cross-laminated film from polyethylene. However, when this cross-laminate is made in the known manner, few available types of machines for manufacturing bags from film, and few available types of machines for filling the bags, can work adequately with film which is so thin and flimsy.

A cross-laminate which, besides the improved strength properties obtained by the orientation and cross-lamination also by virtue of its geometrical structure shows significant improvements in this respect, is described in the inventor's earlier Specification EP-A-0624126.

This is a cross-laminate of a slightly waved configuration in which the material of the curved crests on one or both sides of the laminate is thicker than elsewhere, the material between these thicker curved crests being generally straightened out. (See FIGS. 1 and 2 of said patent publications.) The structure is obtained by stretching between several sets of grooved rollers under special conditions. This stretching also imparts transverse orientation. The disclosed wavelengths of the final products are between 2.2 and 3.1 mm.

Cross-laminates according to the said patent have been produced industrially since 1995 for manufacture of industrial bags from combinations of high molecular weight high density polyethylene (HMWHDPE) and linear low density polyethylene (LLDPE) with film weight about 90 $gm^{-2}$, and the slightly waved shape in combination with the thickened crests imparts a stiffness in one direction of the film which has proven to be very important for the performance of the bag machines with such relatively thin film. However, the film is not adequate for work with the 70 $gm^{-2}$ gauge which satisfies the strength requirements.

Furthermore the corrugated character of the film surface makes a particularly fine print (as often required), impossible and also to some extent reduces the friction between filled bags in a stack, when the layers of this stack are built up with the bags in crisscrossing arrangement as usually done.

As another example an agricultural tarpaulin (e.g. for protection of crops) made from a 70 $gm^{-2}$ cross-laminate of oriented polyethylene films would be a fully adequate substitute of a 100 $gm^{-2}$ tarpaulin made from extrusion-coated woven tape, if only objective criteria were applied. However, in actual fact the average customer to agricultural tarpaulins makes his choice to a great extent on the basis of the "handle" and the appearance, and will reject the 70 $gm^{-2}$ tarpaulin due to its flimsiness, judging that it lacks substance.

The stiffness can of course always be increased by suitable incorporation of a filler, (and the present invention includes that as an additional option) but this will always more or less be at the expense of puncture and tear propagation resistance, especially under impact actions.

Object of the present invention is to add a "feel of substance" and improve stiffness in laminates of films at least in one direction, without sacrificing the laminate's character of feeling and looking like a generally two-dimensional structure; furthermore without essentially harming the puncture and tear propagation resistance, and when desired also providing a good printability at least on one side of the laminate.

The basic idea behind the present invention is to apply the corrugated paperboard principle to laminates of thermoplastic films, but in such a way that the flute structure is made extraordinarily fine ("minifluted"), so as to obtain a laminate which, in spite of the structurally increased stiffness (at least in one direction), can still satisfy the above-mentioned conditions.

In itself the application of the corrugated paperboard principle to the thermoplastic film is not new, but the finest flute structure which has been disclosed in patent literature, namely in U.S. Pat. No. 4,132,581 col. 6, ln. 66, is 50±3 flutes per foot corresponding to a wavelength of about 6.0 mm. It must also strongly be doubted that a wavelength lower than this can be achieved by the method disclosed in the said patent, in which the first bonding process takes place under use of a row of many sealer bars supported and transported by a belt.

The sealer bars are transverse to the direction of movement (the machine direction) so the fluting also becomes perpendicular to this direction.

The use of the method of the said US patent is stated to be manufacture of board material, and the thickness of the fluted ply is indicated to be about 0.004-0.025 inches (0.10-0.625mm). In the example it is 0.018 inches (0.45 mm). Other patents dealing with the use of the corrugated paperboard principle to thermoplastic film for the making of panels or boards are U.S. Pat. Nos. 36,682,736 3,833,440, 3,837,973, EP-A-0325780 and WO-A-94/05498.

Japanese Patent Application Hei 02-052732 discloses laminates consisting of a corrugated thermoplastic film bonded to a flat thermoplastic film, which on its other side is bonded to paper. (The paper and flat sheet are first joined and then the corrugated film is added.) The flutes, which also in this case are perpendicular to the machine direction are pressed flat and adhesively closed at intervals so that a large number of airtight vesicles are formed. The stated use of this product is for cushion material, sound insulating material, heat- and moisture-insulating material and wall decorative material. The thickness of the corrugated sheet and flat sheet are not indicated, neither are the wavelength of the fluting and the length of the vesicles, but it is mentioned that the dimensions can be selected depending on the use of the laminate. However, it must be understood as implied that the wavelength in any case will be no lower than the lowest mentioned in the above-mentioned U.S. Pat. No. 4,132,581 (i.e. about 6 mm). One reason for judging this is that this would not be advantageous for the mentioned purposes, except for decoration, while another reason is that the disclosed apparatus would not be able to work with a lower wavelength (i.e. a lower pitch of the gear rollers) except for making an extremely shallow and practically useless fluting. This is due to the fact that thermoplastic film is resilient and not permanently formable at ambient temperature which as implied by the presentation in the drawing is used in the said method. If the pitch is low on the gear rollers which produce the fluting and the lamination, the corrugated film will "jump out" of the grooves in the forming and laminating roller during its passage from the location where forming of flutes takes place to the location where bonding takes place. The patent publication does not mention any means to hold the flutes in shape in the grooves of the roller.

In a conventional corrugator for manufacture of corrugated paperboard there are provided tracks or shield to hold the fluted paper in the grooves. At ambient temperature this allows the paper to be more readily permanently formed.

Similar tracks or shields in unmodified form cannot be used with thermoplastic film under production conditions since friction against the track or shield quickly would create congestion by heating of the polymer.

An improved, frictionless way of holding of flutes of paper in the grooves of a roller is known from U.S. Pat. No. 6,139,938, namely by maintaining a controlled under pressure within the grooves (see FIGS. 9 and 10 and col. 7 lines 25-34). This U.S. patent deals entirely with corrugated paper laminates having particularly low wavelength while manufacture of corrugated structures from thermoplastic films is not mentioned. However, the improved method of holding the flutes will in fact also, depending on the film thickness, be applicable to fine flutes in thermoplastic film. This was found in connection with the development of the present invention. However as mentioned above, the Japanese patent application does not disclose any precautions to hold the flutes in shape in the grooves.

The development of the particularly fine flute structure, the "miniflutes", which is the object of the present invention has made the corrugated paperboard principle applicable to completely different fields of use such as the fields mentioned at the very beginning of this specification.

This has comprised a development of new types of machinery based on grooved rollers with a very fine pitch. As it will appear from the example the wavelength in a 90 gm$^{-2}$ "minifluted" 2-ply laminate (each ply about 45 gm$^{-2}$) has in actual fact been brought down to 1.0 mm through a process which can be carried out industrially, and after shrinkage of the flat ply transversely to the flutes it has even been brought down to 0.8 mm. Especially by further use of shrinkage it can probably be brought further down e.g. to about 0.5 mm. The mentioned 2×45 gm$^{-2}$ corresponds to an average thickness of about 0.074 mm (2×0.037 mm) if the laminate were pressed flat.

The invention is not limited to pressed-flat thicknesses around this value, but also comprises, very generally speaking, minifluted laminates of an average thickness in compacted form which is roughly about 0.3 mm or lower. Thicknesses down to 0.03 mm or even lower can be made for special purposes.

Nor is the invention limited to the use in connection with cross-laminates of oriented films. For different purposes different combinations of strength properties are required. Cross-laminates can, as is known, be produced with suitable combinations of several categories of strength properties but for many purposes other types of strength laminates may be preferable when the cost of the manufacturing process also is considered, and the present invention can also be useful in such other strength laminates as it further shall be specified below.

By making the wavelength as low as 3 mm or less, the laminate loses its character of being a board material and gets appearance, handle and bending properties like a flexible film (see the example). It also gets improved puncture properties, compared to laminates made from similar plies but with longer wavelength, since in the latter there is a large tendency for the plies to be ruptured individually instead of cooperating in the resistance against the puncture.

The "minifluted" laminate also has the advantage that it can receive a fine print on the flat side and a coarse print on the corrugated side.

Compared to non-corrugated laminates of the same composition and same square meter weight it feels much more substantial due to the increased stiffness in one direction and due to the increased volume.

In the case of cross-laminates it is well-known that a weak bonding between the plies, or strong bonding or line-bonding, gives much improved tear propagation resistance, since it allows the tear to proceed in different directions in the different plies. Thereby the notch effect is reduced. Since a cross-laminate with one ply corrugated will be line-bonded, it will show improved tear propagation resistance, no matter whether the wavelength is short or long, however "minifluting" makes the tear stop after a very short propagation, which of course is very advantageous in most cases.

For the sake of good order, it should be mentioned that there already have been described "minifluted" laminates in literature, however laminates of which at least the fluted ply consists of a material which is not a thermoplastic film or an assembly of thermoplastic films.

Thus U.S. Pat. No. 6,139,938, which has been mentioned above, has for its object a 3-ply paper laminate with a corrugated paper sheet in the middle and flat paper sheets on each side, like normal corrugated paper board, however claimed to comprise 500-600 flutes per meter corresponding to a wavelength of 1.67-2.00 mm. This state purpose is to improve the printability.

Japanese patent publication No. 07-251004 relates to an absorbing product in which a plane thermoplastic synthetic fiber sheet is thermally bonded to a corrugated sheet mainly consisting of active carbon fibers. The wavelength of the corrugation is 2.5-20 mm.

Japanese patent publication No. 08-299385 relates to an absorbent laminate consisting of a fluted non-woven fabric bonded on one side to a plane sheet or film, which can be a thermoplastic film. Between these two plies there is nested a water-absorbing material. The wavelength is claimed to be 3-50 mm, and it is stated that there would not be sufficient space for the absorbing material if it were less. The product is for diapers and the similar products.

More precisely expressed the present invention concerns a laminate comprising at least a monofilm-formed or multi-film-formed ply (A) and another monofilm-formed or multi-film-form ply (B) both mainly consisting of thermoplastic polymer material, whereby at least A consists of cold-orientable material in which A has a waved flute configuration while B is not waved, and B on a first side is adhesively bonded in bonding zones to the crests on a first side of A. A characterising feature of the laminate is that the wavelength of the said configuration is no more than 3 mm. The use of cold-orientable material in A is important for the strength of the product. Furthermore it is normally important that the adhesive bonding has been established through a lamination layer, so that melting of the main portions of A and B can be avoided during the lamination process, and that either the thickness of A generally is the same within the non-bonded zones as it is within the bonded zones, or A exhibits zones which are attenuated in the solid state and extend parallel to the flute direction in such a manner that each bonding zone mainly is located within one of the attenuated zones. These attenuated zones will be referred to as the "first attenuated zones" since there also may be further attenuated zones, as it shall be explained later.

In this connection, an essential attenuation of A in the non-bonded zones, as compared to the thickness of A in the bonded zones, will of course have a negative influence on the resistance to bending in the stiff direction (but it is generally easier to make the fluted laminate so). By contrast this resistance to bending is enhanced, seen in relation to the average thickness of ply A, when each bonding zone mainly falls within one of these attenuated zones. The attenuated zones also facilitate the manufacturing process as it later shall be explained. It is noted that while attenuation by stretching in the molten state reduces the tensile strength, attenuation by stretching in solid state increases the tensile strength in the direction in which this stretching has taken place.

While I here have identified the laminate as comprising the plies A and B, each "ply" can consist of one or more "films", normally extruded films, and each extruded film can and normally will consist of several co-extruded "layers". Thus the "lamination layer" through which the bonding takes place will normally be a co-extruded layer, however it can also be a thin film applied in a conventional extrusion-lamination process.

While an upper limit of 3 mm wavelength has been chosen as a suitable value for distinguishing the product of the invention from corrugated board material, it is generally better to keep the wavelength within 2.5 mm, preferably within 2 mm and more preferably 1.5 mm. As already mentioned and shown in the example the inventor has been able to make it 1.0 mm and under use of shrinkage after lamination even 0.8 mm.

As it appears from the introduction, the use of the present invention is mainly for strength film. This needs not always mean good strength in all directions; by contrast there are cases, e.g. in construction of bags, where the focus should be on the strength in one direction, combined with a certain puncture and tear-propagation resistance. As an example a conventional industrial bag of film thickness 0.160 mm made from a blend of 90% LDPE and 10% LLDPE will typically in its longitudinal direction show a yield force of 20 $Ncm^{-1}$, i.e. a yield tension of 12.5 MPa and in its transverse direction shows a yield force of 16 $Ncm^{-1}$, i.e. a yield tension of 10.0 MPa.

Cross-laminated film material in average thickness 0.086 mm for heat-sealable bags developed by the inventor and manufactured in accordance with the above-mentioned EP-A-0624126 shows in its strongest direction a yield force of 20 $Ncm^{-1}$, i.e. 23 MPa, and in its weakest direction a yield force of 17 $Ncm^{-1}$, i.e. a yield tension of 20 MPa.

Since the invention in principle relates to flexible laminates for uses where relatively high strength is required, although the emphasis of the invention is on stiffness, feel and appearance, the yield tension of the laminate in its strongest direction should normally be no less than 15 MPa, preferably no less than 25 MPa. Correspondingly the ultimate tensile tension is conveniently about twice the said indicated values, or more. Here the cross section in $mm^2$ is based on the solid material only, not including the air spaces, and it is an average, considering that ply A may have attenuated zones.

The yield tensions mentioned here refer to tensile testing at an extension velocity of 500% per minute. They are established from strain/stress graphs. These graphs will begin linear accordingly to Hook's law, but will normally soon deviate from linearity although the deformation still is elastic. In principle the yield tension should be the tension at which the deformation becomes permanent, but this critical value, which is velocity dependent, is practically impossible to determine. The way yield tension normally is determined in practice, and also considered determined in connection with the present invention, is the following:

In case the tension reaches a relative maximum, then remains constant or decreases under continued elongation, later to increase again until break occurs, the relative maximum of the tension is considered to be the yield tension. The sample may also break at this point, and then the yield tension equals the ultimate tensile tension. If however the tension continues to increase with the continued elongation, but with much lower increases in tension per percentage elongation, then the strain/stress curve after yield, and after it practically has become a straight line, is extrapolated backward to intersect with the line which represents the Hook's-Law-part of the stretching. The tension at the intersection between the two lines is the defined yield tension.

An embodiment of the invention is characterized in that the ply A by the choice of polymer material or by an incorporated filler or by orientation, within the non-bonded zones exhibits an average yield tension parallel to the direction of fluting, which when it is determined as explained above, is no less than 30 $Nmm^{-2}$ (cross-section of ply A alone), preferably no less than 50 $Nmm^{-2}$ and still more preferably no less than 75 $Nmm^{-2}$.

As already mentioned, A is preferably solid-state-attenuated in zones (the "first attenuated zones") and each bonding zone is mainly located within a first attenuated zone. These zones should be understood as delimited by the positions where the thickness of A is an average between A's lowest thickness within the first attenuated zone and A's highest thickness within the adjacent non-bonded zone.

Another important embodiment of the invention is characterized in that A within each non-bonded zone and outside the first attenuated zone if such zone is present (delimited as mentioned above) is molecularly oriented mainly in a direction parallel to the direction of the flutes or a direction close to the latter as established by shrinkage tests. Such tests are commonly used. In this connection, a component of orientation in A perpendicular to the direction of the flutes will not contribute to the yield tension in any direction, but will contribute to certain other strength properties.

A preferable limitation of the extension of each first attenuation zone—preferable with a view to the stiffness in one direction—is a laminate in which said first attenuated zones are present in A characterized in that each such zone of attenuated A, if it extends beyond the corresponding zone of bonding into a non-bonded zone of A, is limited to a width which leaves more than half of and preferably no less than 70% of the width of the non-bonded zone, as not belonging to any first attenuated zone, this width being measured along the curved surfaces, and the preferable thickness of these zones are specified in a laminate characterized in that said first attenuated zones of A are attenuated so that the minimum thickness in that zone is less than 75% of the maximum thickness of A in the non-bonded zone, preferably less than 50% and more preferably less than 30% of that maximum thickness.

Additionally to the first attenuated zones it can be very advantageous to have a second solid-state-attenuated zone (hereinafter the second attenuated zone) between each pair of adjacent first attenuated zones. These second attenuated zones should be narrower than the first ones—preferably as narrow as possible but also alternated so that the thickness of A in the zone is as thin as possible—and located on the crests of A on the side opposite to the bonded zones. They act as "hinges", and if they are made narrow and deep enough they improve the stiffness since the cross-section of A becomes zig-zagging instead of smoothly waved (as described further in connection with FIG. 3) and A and B thereby form triangular structures. They also essentially facilitate the manufacturing process, which is explained below.

In addition to the improvements in stiffness caused by the first and second attenuated zones (improvements seen in relation to the average thickness of A) each set of zones also normally improves the resistance against shock actions, i.e. they normally improve impact strength, shock-puncture resistance and shock-tear-propagation resistance. This is because there is started a stretching (or further stretching if A already was stretched) and this stretching normally has a tendency to progress under shock actions, whereby the first and second attenuated zones can act as shock-absorbers.

Normally the wavelength of each flute including an adjacent bonding zone should be no longer than 50 times the highest thickness of A within the flute, preferably no more than 40 times and still more preferably no more than 30 times the said thickness. As an example, if the highest thickness of A is 0.037 mm as in the operative example below, the mentioned values correspond to wavelengths of 1.85, 1.48 and 1.11 mm, respectively.

In order to "integrate" the plies conveniently with each other in order for strength purposes, the width of each bonding zone should normally be no less than 15%, preferably no less that 20% and still more preferably no less than 30% of the wavelength, and in order to achieve a substantial effect of the fluting, the width of each non-bonded zone of A as measured between the two adjacent bonding zones and measured along its curved surface, should preferably be no less than 10% and preferably no less than 20% longer than the corresponding linear distance. This is a measure of the depth of the flutes.

For many purposes, e.g., when increased stiffness against bending is all directions is wanted, there can be a non-waved monolayered or multilayered film C on the side of A which is opposite to B as specified in a laminate characterized in that it comprises a further non-waved monofilm formed or multifilm formed ply(C) of thermoplastic polymer material, C being bonded to the crests of A on the second side of the latter through a lamination layer.

A fluted outside surface on a bag has a mentioned above a disadvantage, namely in connection with printed and stacking of the filled bag. However there are articles in which the special roughness of a fluted surface can be very advantageous in use e.g. on mats. For such articles there can advantageously be two waved mono- or multilayered plies (A) and (D) laminated to the two opposing sides of the non-waved mono- or multilayered film (b), as specified in a laminate characterized in that it comprises a further monofilm formed or multifilm formed ply (D) consisting of thermoplastic, cold-orientable polymer material, said ply having waved flute configuration, the crests on one side of D being bonded to the second side of B through a lamination layer, and the wavelength of D's flute configuration preferably being no more than 3 mm.

The films A, B, C and D will normally consist of polyolefin and will normally be produced by a process which involves extrusion. This will normally be a co-extrusion process by which lamination layers and optionally heat-seal layers are joined with the main body of the film.

At least some of the flutes can be flattened at longitudinally spaced intervals and preferably bonded across the entire width of each flute at the flattened locations to make the flutes form a row of narrow closed elongated pockets. Preferably the flattened portions of a number of mutually adjacent flutes or of all flutes form a series of lines transverse to the longitudinal direction of the flutes. This can make the corrugated laminate look and feel more textile-like, almost make the impression of a woven structure, and make it more flexible in the direction which otherwise is stiff, without losing the feel of bulk and substance. Flattening can also be used to create preferential locations for bending.

Further description of different embodiments of the product and of particular uses will follow after the description of the method.

In accordance with the above characterization of the laminate of the invention, the method of manufacture which takes place under the use of a grooved roller for formation of the flutes, and also under use of a grooved roller for the lamination by heat and pressure (which in certain case can be the same grooved roller) is characterized in that the division on the roller which produced the lamination is at the highest 3 mm. The new method according to the invention is a method of manufacturing a laminate or monofilm formed or multifilm formed ply (A) with another monofilm formed or multifilm formed ply (B) both consisting of thermoplastic polymer material in which A has a waved flute configuration while B is not waved, and B on a first side is adhesively bonded in zones to the crests on a first side of A, in which further the waved flute structure is formed by the use of a grooved roller, and the said bonding with B is carried out under heat and pressure and also under use of a grooved roller, and at least A is selected as mainly consisting of solid-state orientable material, characterized in that the division on the grooved roller which produces the lamination on the said crests is at the highest 3 mm.

New apparatus for carrying out the method is an apparatus for forming a laminate comprising feeding means for feeding a continuous web of ply B formed of a thermoplastic material from a supply to a laminating station; a grooved fluting roller for imposing a waved fluted structure on a ply of thermoplastic material; feeding means for feeding a continues web of ply A formed of a thermoplastic material from a supply to the grooved fluting roller and thereafter to the laminating station in face to face relationship with ply B; wherein the laminating station comprises a grooved laminating roller which is capable of applying heat and pressure between the crests of the flutes of ply A and ply B so as to bond the contacting surfaces of ply A and ply B in bonding zones to form a laminate product; characterized in that the division between the crests of the laminating roller is no more than 3 mm.

The apparatus can be adapted either to make the flutes generally perpendicular to the machine direction as in conventional manufacture of corrugated laminates, or generally parallel to the machine direction. This will be specified below.

Normally the bonding is established through a lamination layer (produced by co-extrusion or by an extrusion lamination technique) in order to avoid weakening, and normally the steps of the process are adapted either to avoid any significant attenuation of the zones in A, or alternatively a stretching in solid state between a set of grooved rollers is adapted to produce the above-mentioned "first-attenuated zones", whereby the grooved roller for lamination is coordinated with the set of grooved rollers for stretching in such a way that each zone of bonding mainly becomes located within a first attenuated zone.

The "second attenuated zones", which have been described above in the description of the product, can be formed by stretching between a further set-of grooved rollers suitably coordinated with the grooved rollers which produce the first attenuated zones.

The advantages of the first and second attenuated zones in terms of product properties have already been explained. For the carrying out of the method, the first attenuated lines allow increases of velocity and therefore improved economy, since the zones in ply A which are going to be bonded, have been made thinner and therefore require less heating time during the application of heat prior to the bonding. Furthermore the first attenuated zones and in particular the combination of first and second attenuated zones can be of great help for the process by acting as "hinges" in ply A. In the type of apparatus in which the grooved roller for lamination has grooves which are generally parallel with its axis, these "hinges" make it possible to direct even relatively heavy A-ply into fine grooves. In the type of apparatus in which the grooves are circular or helical, but in any case approximately perpendicular to the roller axis, the "hinges" help to keep ply A "in track" during its passage from grooved roller to grooved roller, in other works the "hinges" help to coordinate the action of the grooved lamination roller with the action of the preceding set or sets of grooved rollers which form the flute under a simultaneous transverse stretching.

While it is essential for normal uses of the invention for applications as a flexible film that the division on the grooved roller which produces the lamination on the crests is no more than 3 mm, it is generally recommendable to make it no more than 2.5 mm, preferably no more than 2.0 mm and still more preferably no more than 1.5 mm.

The film or films used for ply A is preferably, prior to forming of the waved configuration and prior to making of the first and second attenuated zones (if such zones are made), supplied with orientation in one or both directions, the resultant main direction of orientation being in the direction which is selected to become the direction of fluting. This can be by means of a strong melt orientation, or preferably, alternatively or additionally by known stretching procedures carried out in the solid state. If the process is adapted to make the flutes generally parallel with the machine direction, this will be a generally longitudinal orientation process, which is simple, and if the process is adapted to make the flutes generally perpendicular to the machine direction, it will be a generally transverse orientation process which is much more complicated to establish and usually requires expensive machinery. It is noted that neither of the two closest references, i.e. U.S. Pat. No. 4,132,581 and Japanese patent application Hei 02-052732 have disclosures which indicate that ply A could be oriented in a direction generally parallel with the flutes. In these two publications the flutes are formed in the transverse direction, and had there been thought of using transversely oriented film it would have been natural to mention this, since without special steps the film is not formed so in the extrusion or casting process.

As it already has been described in connection with the product, a further non-waved monofilm formed or multifilm formed ply (C) of thermoplastic polymer material can simultaneously with or subsequent to the bonding of B to A be adhesively bonded to the crests of A on the second side of A. Another useful possibility is that, in a manner similar to the forming and application of A, there is produced a second monofilm formed or multifilm formed ply (D) having waved flute configuration with a wavelength of preferably no more than 3 mm, and the crests on one side of D are laminated to the second side of B simultaneously with or following the lamination of B with A.

In most applications of the invention the mono- or multifilm formed plies should mainly consist of polyolefin, and should be produced by a process involving extrusion. Furthermore the films constituting the plies should normally be made by co-extrusion in which there is co-extruded surface layers to enable the lamination without any melting of the main body of the films.

As it also appears from the description of the product, some of the flutes at least can be flattened after the lamination. This is done at intervals, preferably under heat and pressure sufficient to bond all films in the laminate to each other so that the flutes with adjacent film material form fine elongated pockets closed at each end. The flattening can be carried out with bars or cogs which have their longitudinal direction arranged transversely to the flute direction and which each covers a number of flutes, optionally the entire width of the laminate.

A suitably distinct formation of the first attenuated zones can be established at least in part by giving the crests on the grooved stretching roller intended to produce the stripes a temperature which is higher than the temperature of the crests on the other grooved stretching roller and/or by giving the crests on the grooved stretching roller intended to produce the stripes a radius of curvature which is smaller than the radius of curvature of the crests on the matching grooved stretching roller. A significant orientation mainly in the direction nearly parallel with the fluting, and/or a high co-efficient of elasticity (B) of ply A are also efficient means to give the first attenuated zones suitably distinct borders.

A good way to make the fluting finer than this can be done by purely mechanical means is by use of shrinkage. Prior to the lamination ply B is supplied with orientation generally perpendicular to the direction which becomes direction of fluting, and after the lamination B is subjected to shrinkage in a direction generally perpendicular to the direction of fluting.

As it already has been stated the waved flute structure can be formed in different directions. Thus it can be established mainly in A's longitudinal direction under a generally transverse orientation process by taking A through a set of driven mutually intermeshing grooved rollers, the grooves of the rollers being circular or being helical and forming an angle of at least 60° with the roller axis. It is most practical to make this angle about 90° or at least very close to this. This can be arranged so that A moves directly from its exit from one of the grooved stretching rollers which form the waving on A to the grooved lamination roller, whereby these two grooved rollers are in close proximity to each other and have the same pitch, and are mutually adjusted in the axial direction. The pitch, in this aspect should be measured at the operational temperature of the respective roller.

Alternatively A can move from this exit from one of the grooved stretching rollers which form the waving on A to the grooved lamination roller over one or a series of heated, grooved transfer rollers. The grooved rollers in this row start with the grooved stretching rollers and end with the grooved lamination roller and each is in close proximity to its neighbor or neighbors. Each of the grooved rollers in the row has the same pitch (measured at the operational temperature of the respective roller) and their axial positions are adjustable to each other (see FIGS. 7 and 8 and the example).

When the fluting is produced in the longitudinal direction by means of rollers with circular grooves, ply A's width measured as the direct, linear distance will remain constant from its inlet to the process of the lamination, apart from deviations in very narrow edge regions, which should be trimmed off. Therefore, the ratio between ply A's real width, measured along its curved extension, and A's linear width, which is the same as B's width, equals the transverse stretch ratio and is related to the thickness reductions in the attenuated zones.

However, as it already has been mentioned, the flutes can also be produced in a distinctly transverse direction. In this embodiment, an angle of about 30° between the grooves and the roller axis is probably about the maximum which is practically possible, but it is simplest to work with grooves which are parallel with the roller axis.

The embodiment with grooves parallel to the roller axis is further defined method further characterized in that each grooved roller used to form the flutes in A and A to B, and each grooved roller used to form the first attenuated zones as described herein if such zones are produced, and each grooved roller used to form the second attenuated zones as described herein if such zones are formed, is a grooved roller in which the grooves are essentially parallel with the roller axis, and means are provided to hold the flutes of A in the grooves in the roller on which these flutes are formed and bonded during the passage from the position where the flutes are formed to the position where A is bonded to B, said holding means adapted to avoid a frictional rubbing on A during said passage. The method can be further characterized in that the flutes in A are formed by use of an air jet or a transverse row of airjets which directs A into the grooves on the forming roller. The method can be further characterized in that if first attenuated zones are formed as described herein by grooved rollers acting in coordination with the grooved roller used for lamination, said coordination consists in an automatic fine regulation of the relative velocities between the rollers. The method can be further characterized in that when second attenuated zones are formed as described herein by grooved rollers acting in coordination with the grooved rollers used to produce the first attenuated zones, said coordination consists in an automatic fine regulation of the relative velocities between the rollers.

The means to hold A in fluted form in the grooves from flute formation to bonding, and adapted to avoid a frictional rubbing on A, can be devices for suction through channels from the inside of grooved roller—a method which as already mentioned is known from making corrugated paperboard—or it can be use of tracks or shields which are adapted from the construction used in manufacture of corrugated paperboard by being air-lubricated. This means that the tracks or shields are supplied with fine channels, or preferably a part of each track or shield is made from porous, sintered metal, and pressurized air is blown through the channels or pores to form an air-film on which the fluted ply can flow.

The means for fine regulation comprise a method characterized in that if first attenuated zones are formed as described herein by grooved rollers acting in coordination with the grooved roller used for lamination, said coordination consists in an automatic fine regulation of the relative velocities between the rollers and a method characterized in that when second attenuated zones are formed as described herein by grooved rollers acting in coordination with the grooved rollers used to produce the first attenuated zones, said coordination consists in an automatic fine regulation of the relative velocities between the rollers, which are similar to registration means in multicolor printing technology.

The following sections will describe different selections of the orientation and/or elasticity in the different plies, special utilization of the channels or pockets formed by the flutes, and particular end uses of the product of the invention.

It has already been mentioned that, in an important embodiment of the product according to the invention, ply A within each non-bonded zone and outside the first attenuated zone if such zone is present, is molecularly oriented mainly in a direction parallel to the direction of the flutes or a direction close to the latter.

With ply A so oriented, there are different preferable options for ply B, depending on the uses of the laminate. One very important option is that B also is molecularly oriented and B's orientation within each non-bonded zone in a direction perpendicular to the direction of the flutes is higher than A's average orientation in the same direction within the non-bonded zone. The said two components of orientation are also in this case, indicated by shrinkage tests.

This does not necessarily mean that ply B must have its strongest component of orientation in the transverse direction, in other words the laminate need not necessarily be a cross-laminate. Thus, ply B may simply be highly blown film, which by means of a high blow ratio has obtained a relatively high transverse melt orientation. The embodiment is further characterized is that the yield tension in A in a direction perpendicular to the flutes, both referring to the cross-section of the respective ply and determined in the non-bonded zones on narrow strips at an extension velocity of 500% $min^{-1}$, is no less than 30 $Nmm^{-2}$ and still more preferably no less than 75 $Nmm^{-2}$.

As mentioned there are cases, e.g., in bag construction, in which there is a need for a high yield tension in one direction only, but combined with high puncture resistance. The laminate characterized in that B has a lower coefficient of elasticity than A, both as measured in the direction perpendicular to the flute direction or the laminate characterized in that the choice of B and of depth of fluting is so that by stretching of the laminate perpendicular to the direction of the fluting up to the point where the waving has disappeared, B still has not undergone any significant plastic deformation, preferably B is selected as a thermoplastic elastomer are designed for this.

As it appears from the foregoing the present invention is very useful in connection with cross-laminate, i.e. the laminate which comprises at least two films each of which has a main direction of orientation and which are laminated so that the said two directions cross each other. Different ways of carrying out this aspect of the inventions are as described below, from which also the method of making becomes clear: (1) a laminate characterized in that A and B each has a main direction of orientation, either by being uniaxially oriented or unbalanced biaxially oriented, or by in itself being a cross-laminate of uniaxially oriented or unbalanced biaxially oriented films, such cross-laminate exhibiting a resultant main direction of orientation, whereby the resultant main direction of orientation in A is generally parallel with the longitudinal direction of the flutes, while the resultant main direction of orientation in B forms an angle to the said direction in A; (2) a laminate characterized in that B and C each has a main direction of orientation, either by being uniaxially oriented or unbalanced biaxially oriented, or each in itself being a cross-laminate of uniaxially or unbalanced biaxially oriented films, said cross-laminate exhibiting a resultant main direction of orientation whereby the main direction of orientation in B crisscrosses the main direction of orientation in C; (3) a laminate characterized in that A in a non-oriented state exhibits a co-efficient of elasticity E which is lower than E of both B and C in non-oriented state, preferably by a factor of at least 1.5 and more preferably at least 2; and (4) a laminate characterized in that the flutes are flattened at intervals and bonded across each ones entire width to make the flute form a row of narrow closed pockets.

Suitable methods and apparatus for cross-lamination may be achieved by combining the information in the above mentioned EP-A-0624126, mainly in its introduction, with the formation in the inventor's older GB-A-1526722. Thus, with reference to FIG. 4 of the present drawings, B and C may each be films, including laminates, which exhibit a main direction of orientation whereby B's main direction of orientation criss-crosses with C's main direction of orientation. One of these directions may be parallel with the machine direction, the other perpendicular thereto, or both may from an angle higher than 0° and lower than 90°, preferably between 200 and 70° and more preferably in the range 25°-65° with the machine direction. In this arrangement the waved A supplies to the laminate stiffness against bending, but at the same time, since it establishes a "dislocated" bonding between B and C, it also has importance for the tear propagation resistance. It is known e.g. from the above-mentioned GB-A-1526722, that the superior tear propagation resistance which can be obtained by cross-lamination, depends on having bonding strength which is not too high, since the tear must be allowed to develop along different directions in the different plies of the cross-laminate. Since on the other hand the cross-laminate should not be prone to accidental delamination during use, as for instance described in the said patent, there can be used a combination of strong bonding in spots or lines and a weak bonding over the rest. However, the "dislocated" bonding of cross-laminated B and C through the waved A can provide a better combination of high tear propagation resistance and adequate bonding strength, especially when the coefficient of elasticity E of film A is lower than the coefficient E for both B and C, preferably by a factor of at least 1.5 and more preferably at least 2. Furthermore the flutes may be flattened at intervals and bonded across each ones entire width to make the flute from a row of narrow, closed pockets. The purposes of such flattening have been mentioned above.

In the above description there is mentioned the "main direction of orientation" in the films B and C. If plies B and C each are mono-films, normally with coextruded surface layers, this may be a monoaxial or unbalanced biaxial orientation. However, each of the films B and C may also in themselves be cross-laminates, normally 2-ply cross-laminates.

To clarify this, B may e.g. consist of two plies of equal composition, equal thickness and equal degree of orientation, but one oriented at +30° and the other at −30° to the machine direction. This will result in a main direction of orientation following the machine direction. Similarly C may consist of two equal plies, one oriented at +60° and the other at −60°. The resultant direction of orientation then is perpendicular to the machine direction.

Uniaxial or unbalanced orientation in a film can be obtained under use of spiral cutting of a tubular film with mainly longitudinal direction as disclosed in EP-A-0624126 and GB-A-1526722, both mentioned above, and disclosed in more detail in EP-A-0426702. The latter also discloses a method of obtaining a uniaxial or strongly unbalanced melt-orientation which is perpendicular to the machine direction, namely by twisting of a tubular film coming out of the extrusion die followed by helical cutting under the calculated angle. Another embodiment of the cross-lamination aspect off the present invention is a laminate characterized in that A and B each has a main direction of orientation, either by being uniaxially oriented or unbalanced biaxially oriented, or by in itself being a cross-laminate of uniaxially oriented or unbalanced biaxially oriented films, such cross-laminate exhibiting a resultant main direction of orientation, whereby the resultant main direction of orientation in A is generally parallel with the longitudinal direction of the flutes, while the resultant main direction of orientation in B forms an angle to the said direction in A. The expression resultant main direction of orientation has the same meaning as explained above.

If this laminate is to be used in the construction of bags with heat-seals generally perpendicular to the direction of the flutes, and if such heat-seals may be subjected to high shock-peel forces then the laminate should preferably be constructed as a laminate characterized in that there is only the two mono-or multilayered films A and B and A is unoriented states exhibits a co-efficient of elasticity E which is lower than the E exhibited by B in unoriented state, preferably by a factor of at least 1.5 and more preferably by a factor of at least 2. The fluted softer A-film can then form the inner side for heat-sealing, and the stiffer, smooth B-film can form the outer side of the bag.

Another aspect of the invention("the encapsulation/canalization aspect") comprises a number of embodiments which for different practical purposes utilize the interior cavities in the laminate, optionally in combination with suitable perforations, either to canalize a flow of liquid or air, or to encapsulate filling material in particulate, fibrous, filament or liquid form. The latter may e. g. be a preservative for goods packed in the flexible laminate. These different embodiments are described in the following descriptions. The laminate is characterized in that at least some of the channels formed by the flutes and the matching non-waved film material, which channels may be closed to pockets, contain a filling material in particulate, fibrous, filament or liquid form. Such laminates can also be characterized in that said filling material is adapted to act as a filter material by holding back suspended particles from a liquid passing through the channels or pockets or is an absorbent or ion exchanger capable of absorbing or exchanging matter dissolved in such liquid, said filler optionally being fiber-formed or yarn-formed, and that each filled flute and matching non-waved film material is supplied with a row of perforations, whereby the perforations or groups of perforations in a flute and the perforations or groups of perforations in the matching non-waved film material are mutually displaced so as to force the liquid with the suspended particles, while passing from one surface of the laminate towards the other surface, to run through the filter material in a direction parallel to the longitudinal directions of the flutes. Geotextile substitute can also be constructed that are capable of letting water through but withholding the soil and preferably comprising oriented and crosslaminated films. Such geotextile substitutes are characterized in that said filling material is adapted to act as a filter material by holding back suspended particles from a liquid passing through the channels or pockets or is an absorbent or ion exchanger capable of absorbing or exchanging matter dissolved in such liquid, said filler optionally beingfiber-formed or yarn-formed, and that each filled flute and matching non-waved film material is supplied with a row of perforations, whereby the perforations or groups of perforations in a flute and the perforations or groups of perforations in the matching non-waved film material are mutually displaced so as to force the liquid with the suspended particles, while passing from one surface of the laminate towards the other surface, to run through the filter material in a direction parallel to the longitudinal directions of the flutes. Geotextile substitute are further characterized in that the filler is sand. The method of making these products are described in the following descriptions. The method is characterized in that particulate, liquid or thread/yarn formed material is filled into some at least of those flutes in A which, by the lamination to B, are closed to form channels, this filling taking place before, prior to or during said lamination. The method can also be characterized in that after filling the filled channels are closed at intervals by pressure and heat to form filled pockets. The method can also be characterized in that prior to, simultaneously with or following the filling step perforations are made in the laminate at least on one side to help the filling material or part thereof dissipate into the surroundings or to allow air or liquid to pass through the pack of filling material. The method can also be characterized in that there is made a row of micro perforations on each side of each filled channel, said rows being mutually displaced to force air or liquid which passes through the laminate to run a distance along a channel or pocket, and apparatus suitable for carrying out the method is described in the following description. The apparatus comprising a filler station between the fluting roller (s) and the laminating roller for introducing filling material into the flutes between ply A and ply B. The filling station can also operate in which the filler material is in particulate, fibrous or yarn form.

The embodiment of the present invention in which the fine canals or "pockets" are used to "bury" preservatives, have obvious advantages over the usual method of blending such agents with the polymers to be extruded into film form. One advantage is that the concentration of the preservative can be much higher, another that the preservative needs not be able to withstand the temperature of extrusion. The preservative may reach the object to be preserved by migration alone, or if the agent is solid it may gradually evaporate and diffuse through sufficiently fine perforations or pores.

It is also customary to contain preservative agents in small bags which are placed inside a package. Compared this method of protection, the present invention has the advantage that the preservative agent can be distributed almost homogeneously over the full area of the packing material.

The filter material is adapted to act as a filter material by holding back suspended particles from a liquid passing through the channels or pockets or is an absorbent or ion exchanger capable of absorbing or exchanging matter dissolved in such liquid, said filler optionally being fibre-formed or yarn-formed, and that each filled flute and matching non-waved film material is supplied with a row of perforations, whereby the perforations or groups of perforations in a flute and the perforations or groups of perforations in the matching non-waved film material are mutually displaced so as to force the liquid with the suspended particles, while passing from one surface of the laminate towards the other surface, to run through the filter material in a direction parallel to the longitudinal directions of the flutes has many potential uses, e.g. as a geotextile (geotextile substitute capable of letting water through but withholding the soil, constructed according and preferably comprising oriented and crosslaminated films, where the filler is sand) but also for instance for water treatment in the chemical industry and in gas face masks.

Although the claims relating to these filter materials, including the weather-protective laminate is made to be weather (rain and wind) resistant and air-permeable, characterized in that at least some of the channels formed either by waved ply A and non-waved ply B and/or C and/or waved ply D are connected to the environment on both sides of the laminate through perforations, the perforations on the two sides of a channel being mutually displaced so as to force air or water which pass through the laminate to run a distance through a channel, it should be understood that similar products having wavelength somewhat higher than 3 mm also have important uses and are considered inventive new products. Thus in a further aspect of the invention there is provided a laminate comprising at least a monofilm formed or multifilm formed ply (A) and another monofilm formed or multifilm formed ply (B) both mainly consisting of thermoplastic polymer material, whereby at least A consists of cold-orientable material in which A has a waved flute configuration while B is not waved, and B on a first side is adhesively bonded in bonding zones to the crests on a first side of A in which the adhesive bonding has been established through a lamination layer, and that either the thickness of A is generally the same within the non-bonded zones as it is within the bonded zones, or A exhibits first solid-state-attenuated zones (hereinafter the first attenuated zones) extending parallel to the flute direction, each bonding zone mainly being located within a first attenuated zone, the laminate being moisture resistant but air permeable. The laminates are useful for forming raincoats and tarpaulins. Other uses in which an additive is incorporated into the flutes are described below.

Other important uses of the invention are for bags and self-standing pouches. In this connection, reference is made to the following products: (1) a bag made from the laminate of this invention characterized in that the laminate comprises only the two mono-or multifilm formed plies A and B, and in that the bottom and top of the bag are generally perpendicular to the longitudinal direction of the flutes; (2) a self-standing bag or pouch made from the laminate of this invention, in which the bottom of the bag or pouch is gusseted, and front and back faces of the bag or pouch are adhesively joined at their edges preferably by heat-sealing, characterized in that the laminate comprises only the two mono-or multifilm formed plies A and B, and in that the bottom and top of the bag or pouch are generally parallel with the longitudinal direction of the flutes; and (3) a self-standing bag or pouch characterized in that the capability of the bag or pouch to stand on its own is enhanced by flat-pressed lines generally perpendicular to the longitudinal direction of the flutes.

For all uses of the present invention, a very interesting and wear-resistant print can be obtained when, prior to the lamination, A and/or B is supplied with print on the surface to become the inside of the laminate, the printing process being in register with the flute-forming and lamination processes so as to limit the print generally to the non-bonded zones. This durable print may form a text, a decorative pattern or simply lines which accentuate the fluting or the textile-like appearance of the laminate. Special decorative effects can be achieved if the print provides a metallic appearance or a mother-of-pearl effect.

The invention shall now be explained in further detail with references to the drawings.

Figure 9A:
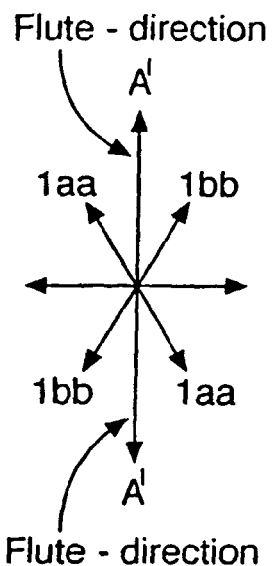
Figure 9B:
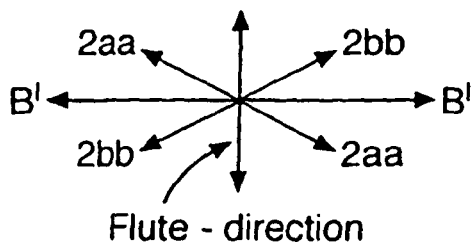
Figure 9C:
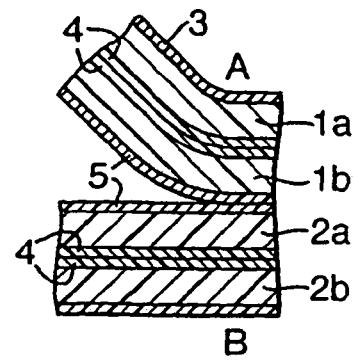

FIGS. 9*a*, 9*b* and 9*c* are sketches illustrating the crosslaminate characterized in that A and B each has a main direction of orientation, either by being uniaxially oriented or unbalanced biaxially oriented, or by in itself being a crosslaminate of uniaxially oriented or unbalanced biaxially oriented films, such cross-laminate exhibiting a resultant main direction of orientation, whereby the resultant main direction of orientation in A is generally parallel with the longitudinal direction of the flutes, while the resultant main direction of orientation in B forms an angle to the said direction in A.

Figure 10A:
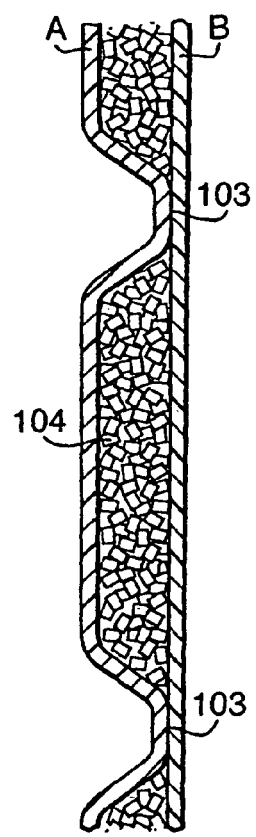
Figure 10B:
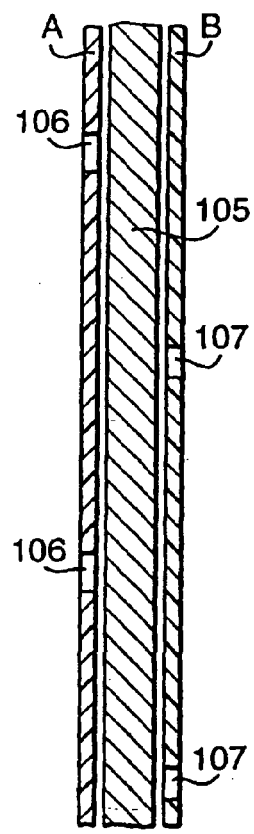
Figure 10C:
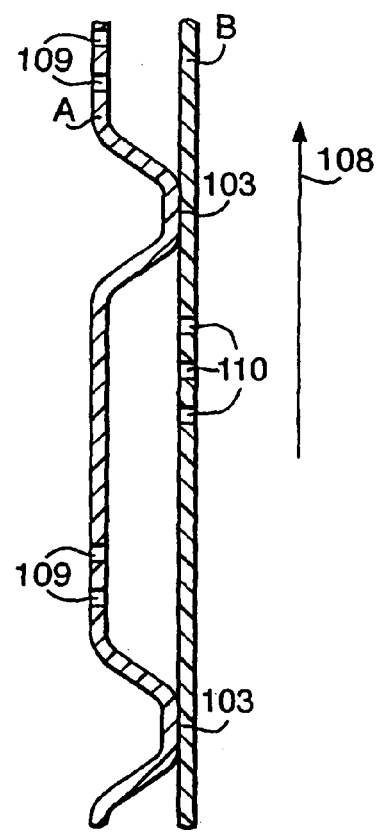

FIGS. 10*a*, *b* and *c* represent sections parallel to the flutes and through the middle of a non-bonded zone, showing applications of the invention in which the channels or pockets formed between ply A and ply B are used as mini-containers or to canalize a flow of air or water, namely in FIG. 10*a* as mini-containers for a protective agent, in FIG. 10*b* for filtration and in FIG. 10*c* for weather protection.

Figure 8:
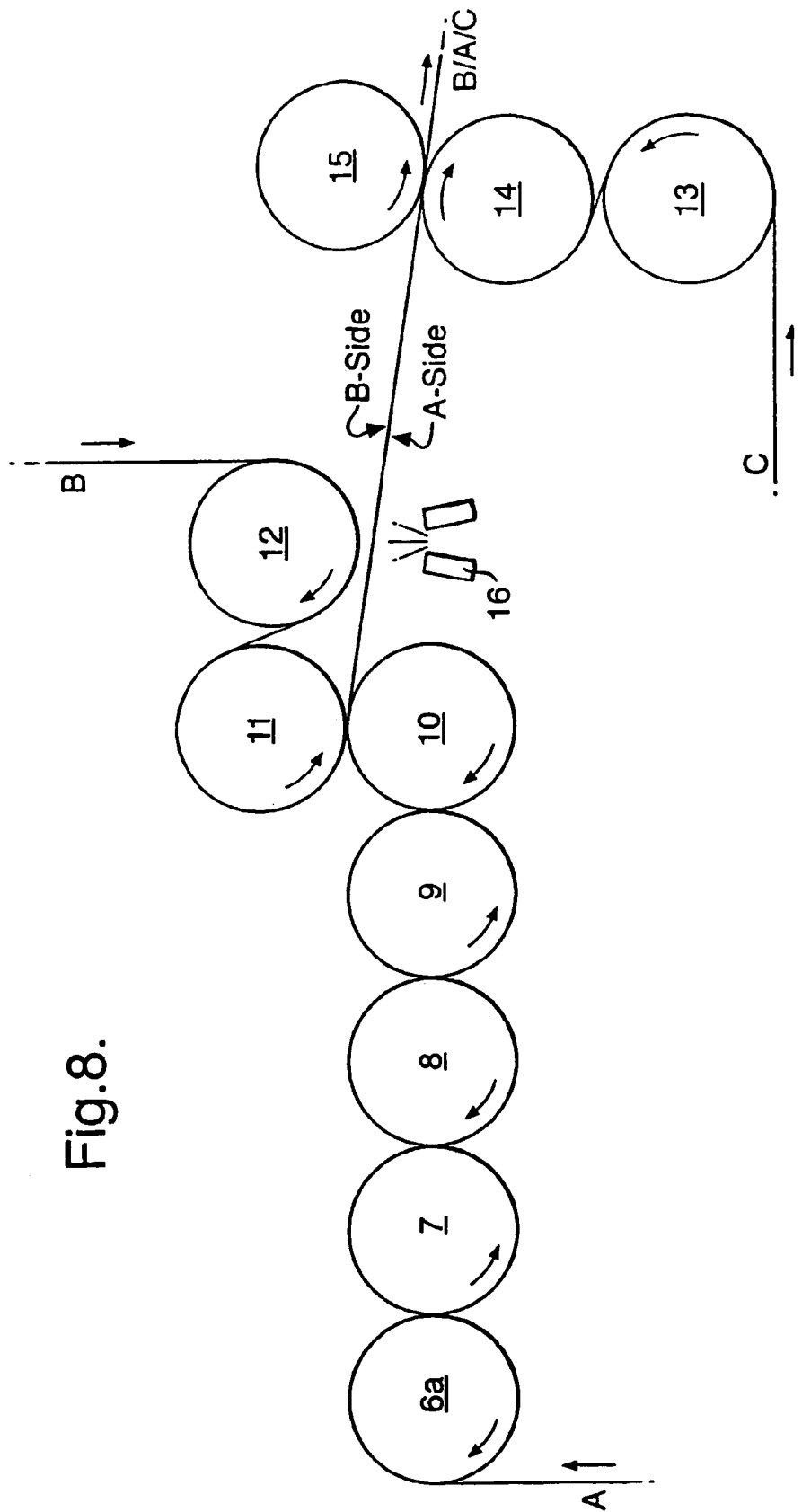
FIG. 8 is a sketch of the machine line corresponding to FIG. 7 with addition of the means to laminate straight film C to A opposite to B.
Figure 11:
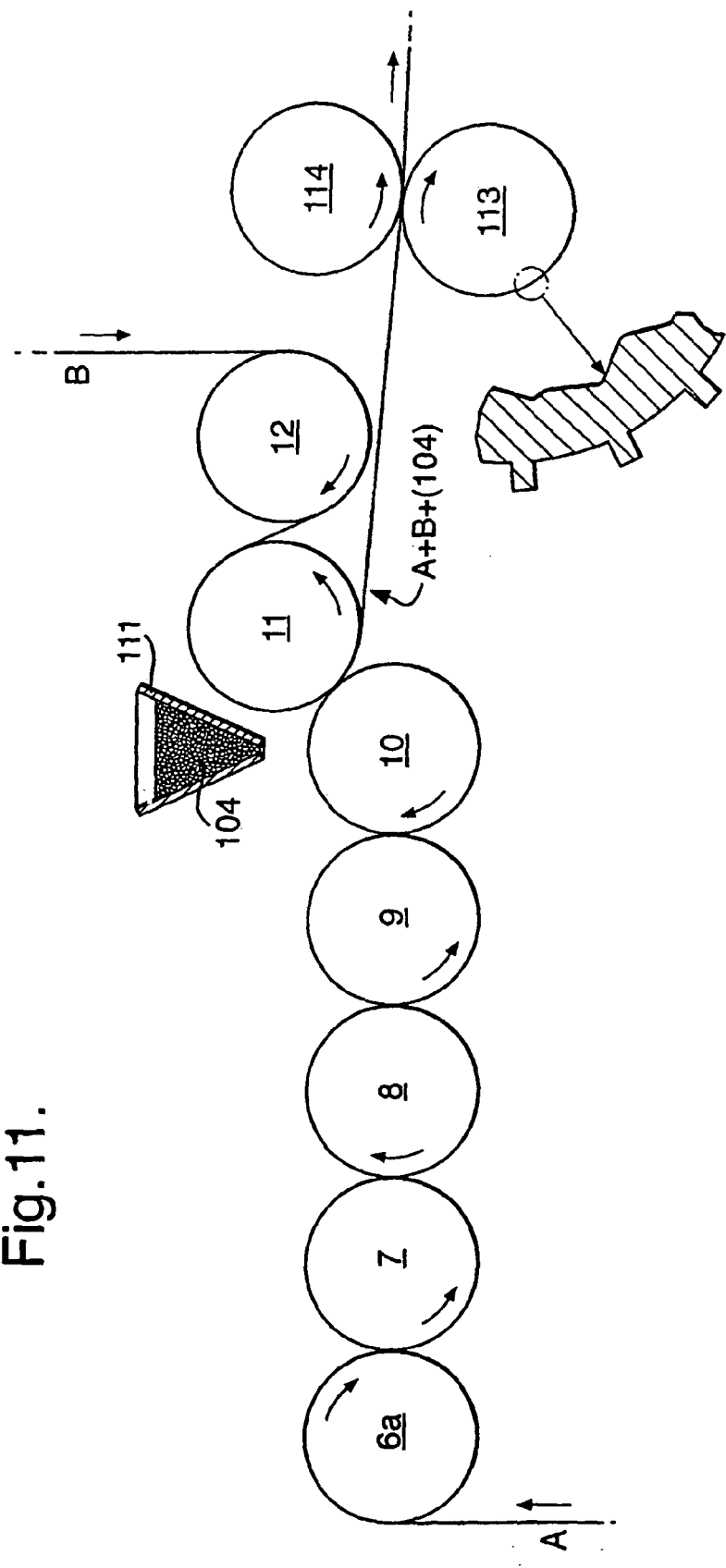

FIG. 11 shows a modification of the lamination station of FIG. 8 in which there are added filling devices to fill particulate material into the flutes before the lamination, and added sealing equipment to form transverse seals after the lamination, thereby making closed pockets which serve as "minicontainers" for the particulate material.

Figure 12:
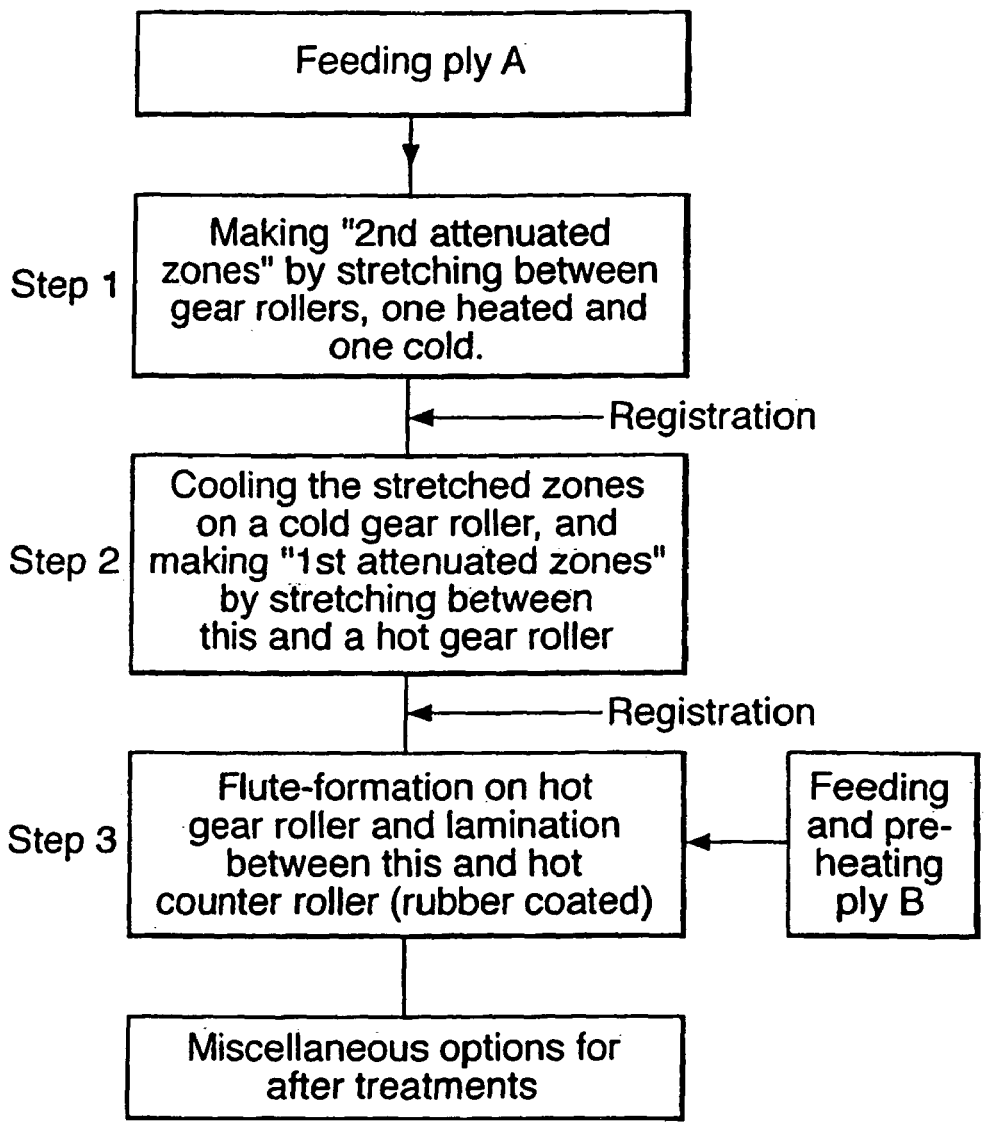

FIG. 12 is a flow-sheet showing a process for producing the laminate with transverse fluting and with "first" and "second" attenuated zones (as these expressions have been defined).

Figure 13:
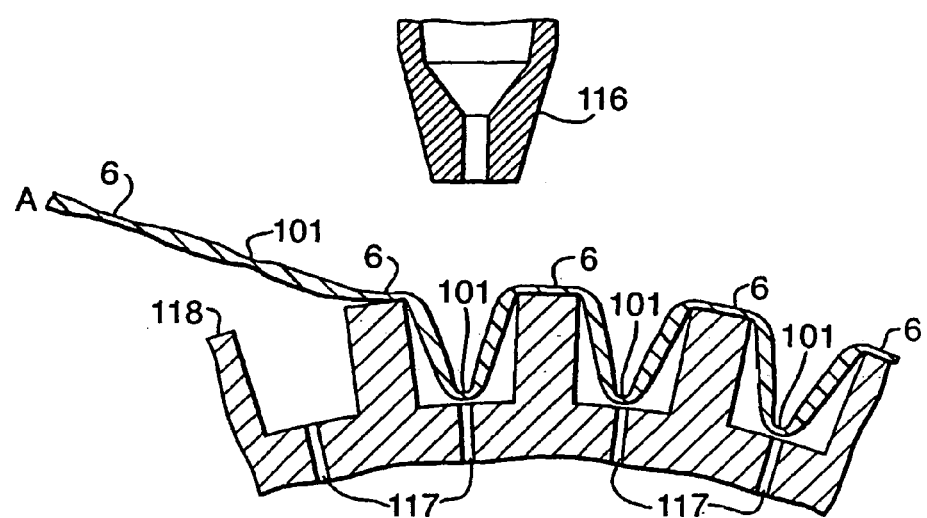

FIG. 13 shows a detail of a grooved lamination roller for formation of transverse fluting, air jets being used to direct the ply into the grooves and vacuum being used to retain it there.

With references to FIGS. 1 to 5 it should be mentioned for the sake of clarity, that the wavelength referred to in the foregoing and in the claims, is the straight linear distance from x to z. This distance is preferably 3 mm or lower, and as it appears from the example, the inventor has been able to make it as small as 0.8 mm, which however needs not be the ultimate lower limit obtainable and useful. It is noted that U.S. Pat. No. 5,441,691 (Dobrin et al.) makes embossed film (not heat-bonded laminates) having a generally circular shape of the bosses, with a spacing from centre to centre which can be still finer than these 0.8 mm, however the bosses of this patent are drawn much thinner than the main body of the film.

Figure 1:
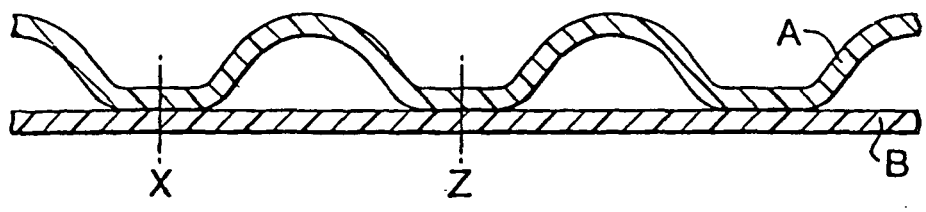
FIGS. 1, 2, 3, 4 and 5 are cross-sections representing four different structures of the laminate of the invention, comprising the minifluted ply A, or plies A and D, and the straight ply B or plies B and C. The flutes in each of these structures can extend longitudinally or transversely, seen in relation to the machine direction of the flute-forming and laminating machinery.

In FIG. 1 the thickness of ply A is generally the same across the ply. In case of transverse fluting this can be achieved by the process shown in FIG. 12 (without preceding formation of attenuated zones) however there is a limit, which is of practical importance, of how fine the wavelength can be, seen in relation to the thickness of ply A.

In case the flutes are made parallel with the machine direction, for formation of the flutes and the lamination is preferably carried out generally as shown in FIG. 8. This means there will always be a transverse stretching between intermeshing grooved rollers, and the degree of fluting will correspond to the degree of stretching. When film is stretched between very fine grooved rollers, there will be a strong tendency to localize the stretching entirely or predominately on and near to the tips of the grooves. This can be avoided, but with difficulty, by using film which in a preceding process has been transversely stretched, and feeding the film unto the roller at a temperature which is higher than the temperature of the roller.

However, in the laminate structures shown in FIGS. 2 to 5 the differences of thickness resulting from grooved roller stretching has been utilized in a way which generally is an advantage for the properties of the product. By the exact registration between the grooved rollers for stretching, the grooved roller for lamination and a grooved transfer roller therebetween, it is arranged that each bonding zone mainly falls within an attenuated zone. As it appears from FIG. 3 there can be two sets of attenuated zones for each zone of bonding, namely a series (6) of wider ones ("the first attenuated zones") within which the bonding zones fall, and a set of shorter ones (101), the latter referred to as the "second attenuated zones".

Figure 3:
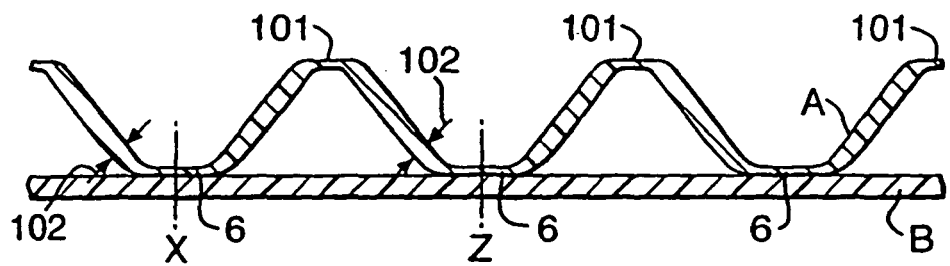
Figure 4:
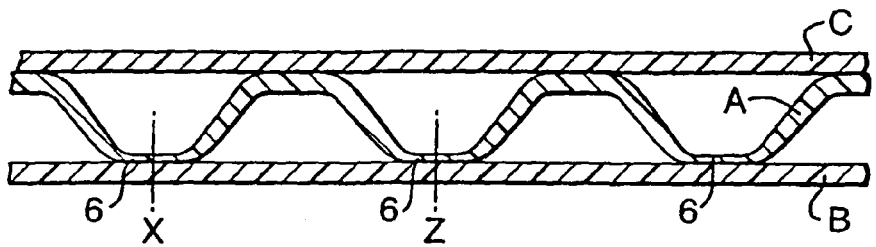

By attenuating ply A at the basis where it is bonded to ply B, the thickness of A is minimized at the location where its contribution to stiffness in the stiff direction in any case is insignificant. By introducing the narrow "second attenuated zones" which act as "hinges", the cross-section becomes almost triangular as shown in FIG. 3. This means that the stiffness is further improved. These attenuated zones also introduce a tendency in the material to stretch rather than rupture under impact actions.

To clarify the concepts, each first attenuated zone (6) is per definition delimited by the locations (102) where the thickness of ply A (or ply D) as indicated by arrows is the average between the smallest thickness in this zone and the highest thickness in the adjacent non-bonded zone.

Structures with "first attenuated zones" as shown in FIGS. 2 to 5 and structures with both "first and second attenuated zones", as shown in FIGS. 3 can also be produced with machinery which make transverse fluting. This shall be described later.

Figure 6:
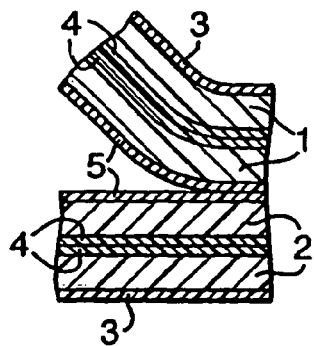
FIG. 6 is an enlarged detail of FIG. 1 to illustrate how these plies themselves can be laminates of films, and how these films can be multilayered as made by co-extrusion, this being done to facilitate bonding and lamination.

In FIG. 6 both plies A and B are in themselves laminates, for instance cross-laminates characterized in that A and B each has a main direction of orientation, either by being uniaxially oriented or unbalanced biaxially oriented, or by in itself being a cross-laminate of uniaxially oriented or unbalanced biaxially oriented films, such cross-laminate exhibiting a resultant main direction of orientation, whereby the resultant main direction of orientation in A is generally parallel with the longitudinal direction of the flutes, while the resultant main direction of orientation in B forms an angle to the said direction in A, and each film from which the plies are produced is co-extruded. Therefore A and B are each formed by a lamination process(the "pre-lamination") prior to the lamination of A to B. Layer (1) is the main layer in each of the two coex films which make A, and layer (2) is the main layer in the two coex films which make B. Layers (1) and (2) can e. g. consist of high density polyethylene (preferably HMWH-DPE) or iso- or syndio-tactic polypropylene (PP) of blends of one of these polymers with a more flexible polymer, for instance, for HMWHDPE, LLDPE. If stiffness is the most preferred property of the minifluted laminate, plain HMWH-DPE or plain PP may be chosen, but if tear and puncture properties play a more important role and/or superior heatseal properties are essential, the mentioned blends may be more suited.

Layers (3) are coextruded surface layers with the 5 function to improve the heat-seal properties of the finished, minifluted laminate and/or modify its frictional properties. Layers (4) are co-extruded surface layers ("lamination layers") with the two functions: a) to facilitate the pre-lamination and b) to control the bonding strength (in cross-laminates the bonding should not be too strong, otherwise the tear propagation strength suffers).

Similarly, layers (5) are co-extruded surface layers to facilitate the lamination of the entire A to the entire B and control the strength of the bonding between A and B.

Figure 2:
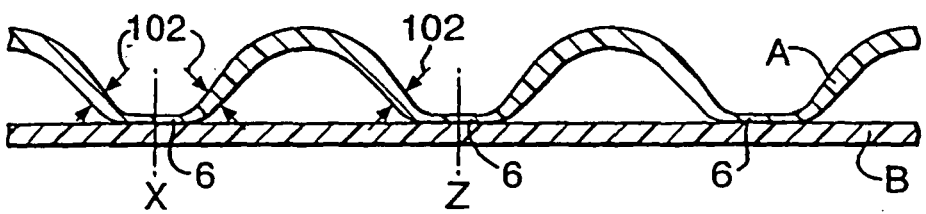
Figure 7:
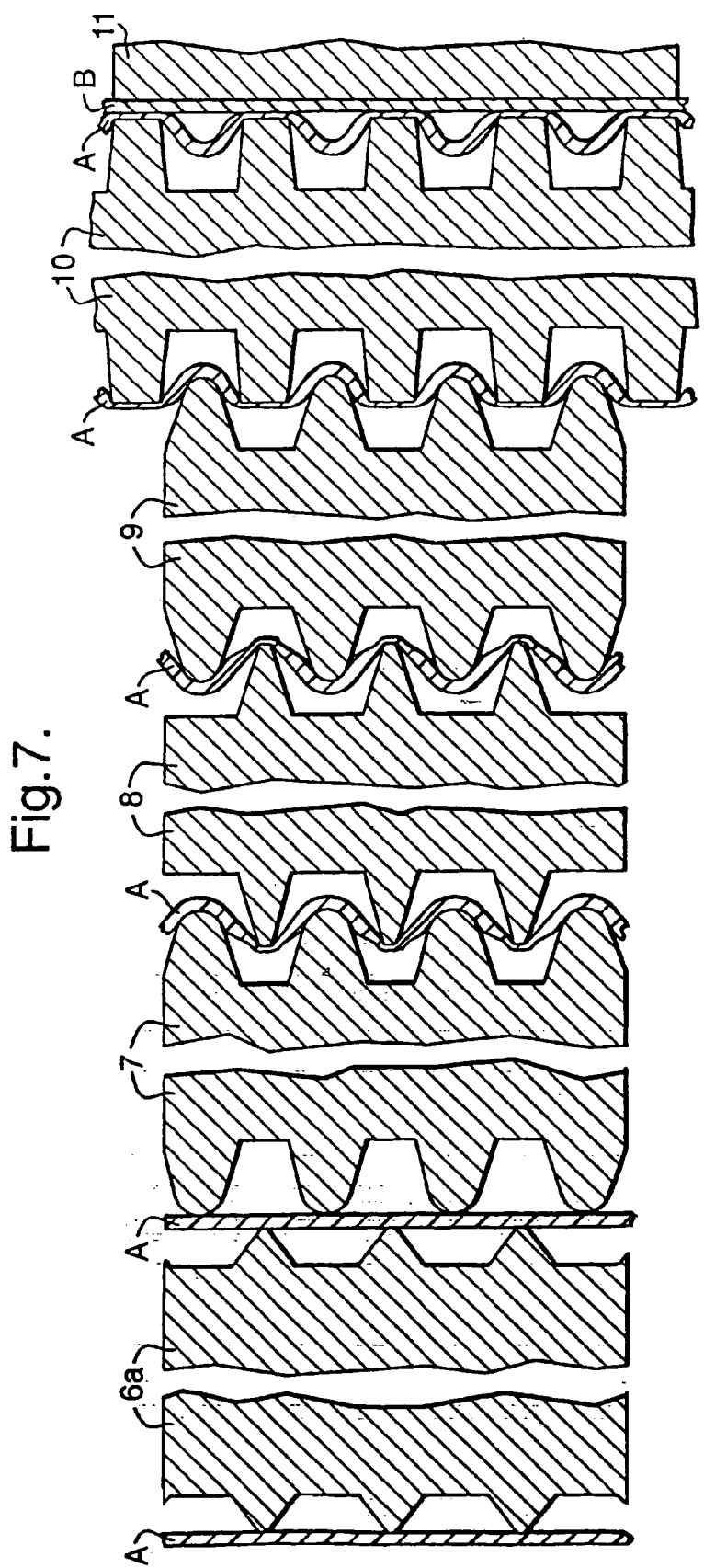
FIG. 7 is a principal sketch representing the steps from formation of the miniflutes in A to lamination of A with B in the manufacture of the product shown in FIG. 2, the different steps being represented by the cross-sections of the films A and B and by the cross-sections through the axis of the rollers of the surfaces of the rollers.

With reference to FIG. 7 and FIG. 8 the structure shown in FIG. 2 can be formed by passing film (A) first over the grooved pre-heating roller (6*a*) which heats it only along the lines which shall become attenuated, then over the grooved stretching rollers (7) and (8), further over grooved transfer and flute-stabilizing roller (9), and finally over grooved lamination roller (10) and its rubber-coated counter-rollers (11), while film (B) is passed over the smooth rollers (12) and (11).

The grooves of all of the rollers are circular so that the flutes are formed in the machine direction. If B is transversely oriented and therefore has a tendency to transverse shrinkage, rollers (12) and (11) are preferably supplied with devices, e.g. belts, to hold the edges (not shown). All of these rollers are temperature controlled rollers, rollers (9), (10), (11) and (12) being controlled at the lamination temperature, rollers (6a) and (8) at a somewhat lower temperature and roller (7) at a temperature about 20 or 30° C. (There can be further rollers for preheating of B). By choice of suitable, coextruded surface layers—see (5) in FIG. 6—the lamination temperature is kept far below the melting range of the main layers in (A) and (B). The temperature of the zones (6) in (A) during the transverse stretching between rollers (7) and (8) is preferably still lower, e.g. in the range of about 50-70° C. and the rest of (A) much lower, e.g. around room temperature, as it also appears from the mentioned roller temperatures. If the main layers in (A) and (B) consist of plain HDPE or blend of HDPE and LLDPE, the lamination temperature is preferably chosen between about 80 and about 110° C., and the coextruded lamination layers, which can consist of a suitable plain or blended copolymer of ethylene, are chosen to produce lamination at this temperature.

The crests on roller (8) has very small radius of curvature, e.g. about 0.05 mm or an extremely narrow "land". The crests on roller 6a which have the function to preheat, may, depending on the film, be similar or somewhat rounder or with a slightly wider land. The crests on rollers (7) and (9) have a higher radius of curvature or a wider land, to avoid transverse stretching on these crests. Suitable values for the sizes of the grooves are mentioned below in the example.

The different temperatures on the different grooved rollers cause different thermal expansions, compared to a state where all have room temperature, and this must be taken into consideration when the grooved rollers are constructed, since they must fit exactly to each other during operation. (10° C. heating of a 10 cm long steel roller segment causes about 0.011 mm expansion of this segment). Reference is again made to values in the example.

Rollers (7), (8) and (10) are driven, while rollers (6a), (9), (11) and (12) may As it will be understood, the attenuation of A in the zones (6) takes place almost entirely by the transverse orientation at a temperature essentially below the melting range of the main body of A. This attenuation therefore does not cause any significant weakening of A's transverse strength, contrarily it will normally cause an increase of this strength. After the transverse stretching on the crests of roller (8) the width of the "first attenuated zones" (6) should preferably not exceed (as a rule of the thumb) half the wavelength, but the degree of stretching should normally be as high as practically obtainable, while the degree of transverse stretching between the "first attenuated zones" normally should be as low as practically obtainable, with the intended result that ply A in the unbonded zones becomes as thick as the chosen square meter weight of A allows and the flutes become as high as possible.

A practical way of achieving that the first attenuated zones and the zones of bonding match with almost equal width is the following: the relatively flat crests on the laminating roller (10) are made slightly wider than the chosen width of the first attenuated zones, and the temperature and velocities are adjusted to each other in such a way that the first attenuated zones (6) become heated to a temperature at which the material will laminate with B, while the thicker A-ply between zones (6) does not reach a temperature at which lamination can take place.

The use of longitudinally oriented A-ply, where the A-ply within each non-bonded zone and outside the first attenuated zone if such zone is present, is molecularly oriented mainly in a direction parallel to the direction of the flutes or in a direction close to the latter as determined by shrinkage tests, will impart a tendency in A to "neck down" and form thin longitudinal lines when A is stretched transversely. Therefore, longitudinally oriented A-ply will enhance the possibilities of getting a sharp distinction between strongly attenuated zones (6) and non-attenuated ply A between these zones.

Theoretically there will always occur some attenuation also of the B-ply in the zones of bonding, since the bonding is established under pressure, but this attenuation has no positive effect and should preferably not exceed 20%. Due to the presence of lamination layers (see (5) in FIG. 6) such attenuation of the B-ply can be made negligible.

In FIG. 8 the minifluted laminate leaving lamination rollers 10 and 11 is marked (B/A), In this figure it proceeds for lamination in conventional manner with the non-waved, mono-/or multilayered film C coming from the smooth steel roller (13). The lamination takes place between the smooth steel rollers (14) and (15) of which at least roller (14) is heated to a convenient lamination temperature and is driven. The waved film A is heated to lamination temperature, at least on its free crests, by means of hot air from the blower (16). Rollers (14) and (15) are kept at a distance from each other which is small enough to effect the lamination but big enough to avoid excessive flattening, e.g. between 0.2 and 0.6 mm. When A, B and C are very thin films, e.g. each in the range of 0.03-0.10 mm thick (for A this refers to the non-waved form) such conventional lamination would have been very difficult due to the floppiness of waved A, but since the flutes now have been consolidated by the bonding to B, the lamination of A to C presents no particular difficulty.

The laminate leaving the lamination rollers (14) and (15) is marked B/A/C. It is cooled, e.g. by air (not shown) and may normally be reeled up or flip-flopped, since it normally is sufficiently flexible material although fluted, or it may directly be cut into lengths.

Figure 5:
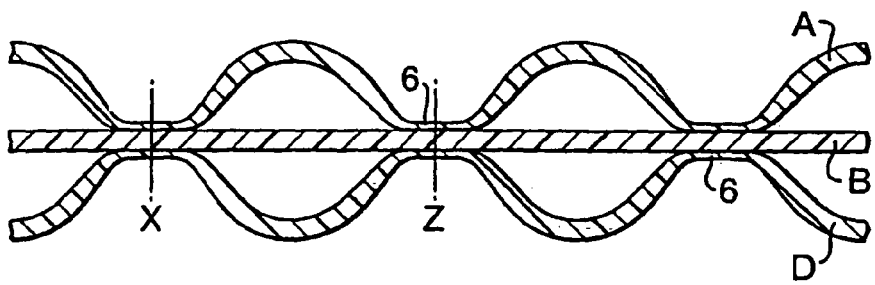

To make the laminate shown in FIG. 5, one option is to make the A/B laminate shown in FIG. 2, and laminate this over the rollers (11) and (10) with the fluted ply D leaving roller (9). This requires exact registration between the rollers which make the A/B laminate and roller (1)). Alternatively B can consist of e.g. two films B1 and B2. Then in two mutually independent processes there are made an A/B1 laminate and a D/B2 laminate, and the two are bonded together with B1 against B2 in an extrusion lamination process.

With certain modification the line shown in FIGS. 7 and 8 can also be used to make the laminate of FIG. 3, which has "second attenuated zones". For this purpose roller (6a) should have the same surface profile and the same low temperature as roller (7), and it should be preceded by and in slight engagement with a roller with the same surface profile as roller (8), which roller should have the same higher temperature as roller (8).

In the minifluted "multi-crosslaminate" shown in FIGS. 9a, 9b and 9c, the two coextruded films (1a) and (1b) from which A is made by "pre-lamination", are oriented in criss-crossing directions, which form an angle lower than 45° with the longitudinal direction (the flute direction) as symbolized by the arrows (1aa) and (1bb). This gives a resultant main orientation direction for A parallel with the flute direction, symbolized by the arrow marked A'. Similarly the two coextruded films (2a) and (2b) from which B is made by "pre-lamination", are oriented in criss-crossing directions, which form an angle higher than 45° with the flute direction, as symbolized by the arrows (2aa) and (2bb). This gives a resultant main orientation direction of B perpendicular to the flute direction, symbolized by the arrow B'.

In FIG. 10a, which as mentioned shows a longitudinal section through a flute in ply A, the latter has been flattened and sealed to ply B at intervals (103) to form pockets or "mini-containers", and these mini-containers have been filled with a particulate substance (104) which has a purpose for the use of the laminate, e.g. for protection of material packed or wrapped up in the latter. As one among many options it may be an oxygen scavenger. To enhance the action of the substance the flutes maybe supplied with fine perforations on the side towards the packed product. The substance may also e.g. be a fire retardant material such as $CaCl_2$ with crystal water, or just fine sand to increase the bulk density of the laminate.

FIG. 11 which shall be described below, shows how the particulate substance can be fed into the flutes of ply A prior to its lamination with ply B, and how the flutes can be closed to pockets by transverse sealing after the lamination, without any essential contamination of these transverse seals.

A laminate between a fluted thermoplastic film and a non-fluted thermoplastic film with a filling material between is known from Japanese Patent publication No. 07-276547 (Hino Masahito). However, in this case the filling material is a continuous porous sheet (for absorption) which extends from flute to flute without interruptions, so that there is no direct bonding between the flute and the non-fluted films. One of the thermoplastic films is first directly extruded unto this porous (e.g. fiberformed) sheet, then the two together are given a fluted shape between gear rollers while the thermoplastic film still is molten, and finally a second thermoplastic film is extruded directly unto this fluted assembly to join with the porous sheet. Hereby the bonding necessarily must be very weak, and the mechanical characteristics must be completely different from those of the present product. The wavelength of the fluting is not indicated.

In the technical filter material for liquid or gas flows shown in FIG. 10b there is inserted a strand or yarn into each flute—in connection with the description of FIG. 11 it shall be explained how that can be done—and both sides of each channel formed by fluted ply A and non-fluted ply B is supplied with a row of perforations, (106) in ply A and (107) in ply B. These rows are mutually displaced as shown so that the liquid or gas passing from one surface of the laminate to the other, is forced to follow a channel over a distance corresponding to the displacement. The fitting between the yarn and the channel maybe improved by shrinkage of A and/or B after the lamination process.

The pocket structure shown in FIG. 10a can also be used for filtration purposes if ply A and ply B are supplied with mutually displaced holes. Then the particulate substance (104) can e.g. consist of active charcoal, or an ion-exchange resin, or for simple filtration purposes fine sand. Also in this case a tightening of the passage by means of shrinkage can be advantageous or may even be essential.

Practical examples of the use of such filter materials are for air filtration systems including absorption of poisonous substances, and ion-exchange processes. In both cases the laminate can have the form of a long web which is slowly advanced transversely to the flow which passes through it.

Another practical use is as a substitute of geotextiles e.g. for road constructions. Such textiles must allow water to penetrate but hold back even fine particles. The present laminate, e.g. filled with fine sand in the pockets, is suitable for this use.

For such filtration purposes, high puncture strength will often be needed, and the laminate then preferably comprises oriented, cross-laminated films.

For the filtration purposes the condition that the wavelength should not exceed 3 mm, is often less important since appearance and handle may not be a primary concern as it is in the case of laminates for ordinary tarpaulin uses.

The weather protective laminate shown in FIG. 10c, e.g. for raincoats, also has a pocket structure, whereby ply A is heat-sealed to ply B by transverse seals at locations (103), but there is no particulate substance in the pockets. Like the laminate for filtration, each line of pockets is supplied with perforations in a displaced system, here shown as groups of perforations (109) in A and similar groups (110) in B, and these groups are mutually displaced. In this sketch it is considered that ply A is on the side where it rains, and a person, animal or item, which the laminate shall protect, is on the ply B side. (It could be the other way round). It is also considered that the direction shown by arrow (108) is upward. Since the perforations (109) are at the bottom of the pockets, and because of the gravity force, only the bottom of the pockets may be filled with rainwater, while in principle no water will reach the perforations (110). On the other hand there is free passage of air and transpiration between the hole groups (109) and (110). Also in this product the wavelength may to some extent exceed 3 mm.

The modification of the FIG. 8 machine-line, which is shown in FIG. 11, is adapted to fill a particulate substance (104) into the channels formed between A and B. The filling is here shown very schematically. The powder (104) is taken from a hopper (111) and is administered by means of an adjustable vibrator (not shown). It falls into the fluted ply A at the upper side of the grooved lamination roller (10). At regular time intervals hopper (111) is filled up with the powder (104). The means for this are not shown. Other conventional systems for administering the powder (104) onto ply A on roller (10) may of course be chosen.

Roller (10) vibrates (means not shown) so that the powder is moved from the higher zones, i.e. those which become bonded zones when A meets B in the nip between (10) and (11), into the lower zones, which become the "channels".

Having left the laminating rollers (10) and (11). The A+B-laminate with powder (104) in the channels moves towards the cog-roller (113)—its surface is shown in a detailed part-drawing— and its rubber-coated counter-roller (114) which together flatten and close the channels by making transverse seals. Roller (113) is vibrated in order to remove powder away from the channel-parts which become flattened and sealed.

Both rollers (113) and (114) are heated to a temperature needed for the sealing, and since the laminate while entering these rollers still is at about a temperature suitable for heat-sealing due to the previous temperatures, this second heat-seal process needs not cause a deceleration of the entire process.

Ply A and/or ply B maybe perforated by means of pin-rollers after rollers (10)/(11) and in front or after the pair of rollers (113)/(114). In case mutually displaced rows of perforations are needed (see FIGS. 10b and c) and pin-rollers for ply A and ply B must be suitably coordinated, and in case the perforations should have a fixed relation to the transverse seals (see FIG. 10c, the pin-rollers must be coordinated with roller (113).

In order to make the product shown in FIG. 10a, rollers (113) and (114) are omitted or taken out of function, and instead of administering powder into ply A, there is at the same place laid a yarn into each flute. Each yarn is taken from a separate reel.

At some stage after rollers (10)1(11), ply A and/or play B may be subjected to transverse shrinkage. If this is done with ply A only, it may be sufficient to heat the ply A-side of the laminate to an adequate temperature by means of hot air or on one or more hot rollers. If ply B should be involved in the shrinkage it may be necessary to hold the laminate at the edges while it shrinks. This may be done by means of an ordinary tenterframe, but the latter should be set up to work "inversely" so that the width gradually is reduced instead of increased.

The methods applied for making pockets from the flutes, fill powder into these flutes, and making suitable perforations, have been explained in connection with the longitudinally fluted laminate. Analogous methods can be applied in connection with a transversely fluted laminate (the general method of making such laminate appears from FIG. 12), and in that case the closing of the channels to form pockets may take place by use of a circularly or helically grooved roller. However, it is not considered practically possible to lay down yam in transverse flutes at industrially acceptable velocities.

The process for making the transversely fluted laminate, which appears from the flow-sheet FIG. 12 is generally analogous to the process which is described in connection with FIGS. 7 and 8, and the profiles of the grooved rollers can also be generally similar, except that for the process of FIG. 12 the grooves extend axially, while for the process of FIGS. 7 and 8 they are circular.

Step 1: Ply A is longitudinally stretched in very narrow zones localized on the tips of a hot roller which has a profile similar to that of roller (8). The grooved counter-roller, which is cold, has a profile like that of roller (7).

Step 2: The warm, stretched "second attenuated zones" are cooled on a cold grooved roller which also has a profile like that of roller (7), and then to form "first attenuated zones" between the "second", ply A is longitudinally stretched between this cold roller and a warm grooved roller which also has a profile similar to that of roller (8). The stretching is localized to the tips of this roller. Similar to the registration in printing technology, step 2 is brought in registration with step 1 under use of a device which optically detects the stretched zones.

Step 3: The flutes are first formed in the grooves of a hot roller with a profile similar to that of roller (10), e.g. under use of compressed air, and are held in the grooves e.g. under use of a vacuum, all as explained in connection with FIG. 13, and ply A is then laminated with ply B between the crests of this grooved roller and a rubber-coated counter-roller, which also is heated. Ply B has been preheated.

There can be different after treatments as explained in the foregoing.

In FIG. 13, ply A which has been supplied first with the very narrow transverse "second attenuated zones" (101), and then with the somewhat wider, also transverse "first attenuated zones" (6), is directed into the grooves (115) of the heated lamination roller by means of compressed air from a row of nozzles of which one (116) is shown. By use of registration means, working on basis of optical detection of zones (6) or (101) it is arranged that the first attenuated zones (6) will cover the crests (118) of the grooved roller. The two sets of attenuated zones act as hinges so that even a quite heavy ply A may be bent and form the flutes. The latter are held in shape in the grooves under use of vacuum applied through channels (117) from the interior of the roller. Thus ply A is moved in flute shape to the nip (not shown) between the grooved roller and the rubber-coated counter-roller, where lamination takes place. The vacuum in the grooves is adjusted so that ply A is held firmly when this is needed, but can be released where that is needed. There can also be a valve arrangement inside the grooved roller to eliminate the vacuum during the release.

EXAMPLE

A 2-ply laminate of fluted ply A and non-fluted ply B with A longitudinally and B transversely oriented is manufactured on a pilot-unit constructed as shown in FIGS. 7 and 8, but terminating after the lamination of A and B have taken place. Both plies consist of one coextruded, cold-stretched 0.037 mm thick film consisting of HDPE with a thin layer on one side, consisting of an ethylene copolymer having a melting range between 95-105° C. This is used as lamination layer in the process. The cold-stretching was carried out near room temperature at a draw ratio about 3:1 and was followed by heat stabilization, all by conventional means, and while the film had flat tubular form. The tube was longitudinally cut to form ply A.

Processes for continuous manufacture of transversely oriented film are well-known and mentioned in the foregoing, but it would have caused practical complications for the inventor to have such film manufactured according to his specifications, and therefore short lengths of the ply A-film were glued together edge to edge with a pressure-sensitive adhesive to form a transversely oriented web.

All of the grooved rollers have the pitch 1.1000 mm at the temperature at which they actually are used, but due to the large temperature differences during the stretching/laminating process, the thermal expansion had to be taken into consideration when these rollers were machined at 20° C., see the table below. The biggest temperature difference between the rollers, as it appears from this table, is 85°, and this corresponds to an expansion of about 0.10 mm per 10 cm roller length, while the accumulated error in the fitting between adjacent rollers from end to end of the rollers must be maintained lower than 0.15 mm to obtain the needed registration.

The table below also indicates the radius of curvature (R) or the length of a "land" on the crest of each grooved roller, as seen in the axial section in FIG. 7.

|  | Roller No. | | | | |
| --- | --- | --- | --- | --- | --- |
|  | 6a | 7 | 8 | 9 | 10 |
| Crest | land | R = | land | R = | Land |
| mm | 0.4 | 0.2 | 0.15 | 0.15 | 0.7 |
| Temperature ° C. | 70 | 20 | 70 | 105 | 105 |
| Pitch mm | 1.0993 | 1.1000 | 1.0993 | 1.0988 | 1.0988 |

It is of course not practically possible to achieve such a high accuracy in the pitch seen individually from groove to groove, but it is essential that errors in the pitch do not accumulate by more than 0.05 mm. This is best achieved when the surface parts are made from segments and accumulated errors are eliminated by fine grinding of the segment ends and/or thin shims (foils) are inserted between the segments. In the actual pilot machine the length of the grooved part of each roller surface was about 450 mm and was assembled from 3 segments. It is judged that in an industrial machine the rollers can be made in up to about 5 m length, but in that case the accuracy from end to end has to be checked with laser measurements and adjustments made as explained.

The transverse stretching, which is the basis for the flute-formation and which forms the "first attenuated zones"—later the zones which become bases, not crests of the flutes in the laminate—takes place by the intermeshing between rollers (7) and (8) and becomes localized to a zone on and nearby the crests of roller (8). This is because roller (8) is hot and has a relatively sharp crest, while roller (7) is cold and has a much rounder crest (higher radius of curvature R) It is relevant also in this connection that ply A is uniaxially oriented in the machine direction and therefore has a high tendency to "neckdown" and form sharply delimited attenuated zones when it is transversely stretched.

The function of roller (6a) is to preheat the zones which are to be stretched on the tips of roller (8). In this example the "land" on the crests of roller (6a) are wider than the "land" on the crests of roller (8). This has been chosen in order to counteract the very pronounced tendency in the film to "neckdown", in other words, to make the limits of the "first attenuated zones" smoother. In other cases e.g. when ply A has a pronounced transverse orientation and therefore no tendency to "necking down" by transverse stretching, the "land" on the crests of roller (6a) which preheats the film, should be no wider than the "land" on the crests of roller (8).

Between rollers (6a) and (7) there is a slight but almost zero engagement to avoid wrinkles without stretching the films.

Having left the transverse stretching roller (8), ply A is taken over by transfer roller (9). This is heated in order to help the shaping of flutes in the zones which have not been stretched. At this stage the "first attenuated zones" are still deeply curved, but when (A) is taken over by the flat 0.4 mm wide crests (lands) on the grooved laminating roller (10) the "first attenuated zones" are flattened almost over their entire width except at their boundaries where the thickness gradually increases, and by means of the rubber-coated counterroller, which on its surface has temperature 80° C., this flat portion is laminated to the transversely oriented ply B.

Prior to the experimental run the axial position of the grooved rollers are very carefully adjusted to each other, and so is the intermeshing between adjacent grooved rollers. The intermeshing between rollers (7) and (8) is set to make the depth of the fluting 0.40 mm, as measured in microscope on a cross-section of the finished laminate.

When leaving the stretching/laminating apparatus, the minifluted laminted is aircooled and is reeled up on a core of diameter 250 mm. In the test report below this laminate is called "Sample I".

It is noted that although the pitch of each grooved roller in the line is 1,1000 mm referring to the temperature at which the roller has been operated, the wavelength of the fluting in the final minifluted laminate, due to transverse shrinkage, is only 1.0 mm.

As a principal experiment there is out specimens of this film, 30 cm long in the machine direction and 20 cm wide in the transverse direction, and these specimens are subjected to further transverse shrinkage by a primitive arrangement which imitates an "inverse" operation of a tenter frame. The two 30 cm long edges are fixed to two sticks, which are held by hand, and an even shrinkage is arranged by moving the specimen over a roller surface, which is heated to 115° C., with the B film contacting the roller. Hereby the wavelength is reduced from 1.0 mm to 0.8 mm.

Sample II, made for comparison: By a relatively primitive arrangement there is made specimens of corrugated board material from the same film as used to make "Sample I" (coextruded coldstretched HDPE-film of thickness 0.037 mm), with all dimensions of sample A, namely as follows:

| Sample | Wavelength mm | Bonded Zones mm | Flute-depth mm |
|--------|---------------|-----------------|----------------|
| I      | 1.0           | 0.4             | 0.4            |
| II     | 5.5           | 2.2             | 2.2            |

It is noted that II's wavelength, 6.0 mm, is slightly less than the minimum mentioned in patent literature namely in U.S. Pat. No. 4,132,581.

In both samples I and II, the direction of orientation in ply A is parallel with the flutes, and the direction of orientation in B is perpendicular to the flutes.

Sample B is manufactured with a small laboratory machine constructed as explained in connection with FIG. 13, but in this case there has now been any need to make "first attenuated zones" and "second attenuated zones". The flutes become perpendicular to the machine direction. Like the grooved laminating roller (10) used in the manufacture of sample I, this grooved laminating roller is heated to 105° C.

Sample III, made for comparison: The same film (coextruded oriented HDPE, 0.037 mm thick) is crosslaminated with itself without any fluting being made.

Comparisons between samples I, II and III:

Appearance and handle:
- (II) looks and feels like a board material, but is instable when bent or compressed between the fingers.
- (I) has a rather textilis look, can stand a substantial amount of bending and compressionbetween the fingers without changing its character, and it has a feel of "bulk".

Bending Tests:

(I) and (II) are bent over cylindrical bodies of different diameters, and it is examined how small that diameter can be before the flutes begin to collapse in a non-elastic manner, i.e. so that there remain marks in the flutes after the specimen has been straightened out again.

(II) can withstand bending down to a diameter of 250 mm, while (I) can withstand bending down to a diameter of 50 mm.

Stiffness Measurements:

10 cm long specimens are cut out from samples (I), (II) and (III).

The specimens from sample (I) each comprises 20 flutes and at the edges a bonded zone. The width of these 15 specimens is 21 mm.

The specimens from sample (II) each comprise 4 flutes and at the edges a bonded zone. The width of these specimens is 23 mm.

The width of each sample (III) specimen is 21 mm.

For controlled bending of the specimens there is made a very lightweight support arrangement comprising two supports with 50 mm spacing between. This support arrangement is placed on the table of a letter balance. The bending is effected by means of a cylinder which has a diameter 50 mm and starts pressing at the middle of the supported sample. This cylinder is assembled on a stand and can be moved up and down. Corresponding values of the depression in mm and the resisting force in grams are measured and plotted. Up to a certain limit there is a linear dependence, and from the declination of the line and stiffness is calculated as grams force per mm depression. In order to obtain reliable reading for sample (III), 10 specimens are laid one on top of the other. The value of stiffness is determined for this bunch and divided by 10.

Results

Surprisingly samples (I) and (II) show the same stiffness, namely 1.6 gram per mm, while sample (III) shows 0.13 gram per mm, in other words the present invention has magnified the stiffness in one direction by a factor of about 12, as measured by this method.

It should have been expected that sample (III) would have shown higher stiffness than sample (I). When this is not the case, the explanation probably is that the flutes may have been pressed relatively flat right from the beginning of the depression, although in elastic manner.

In the characterization of the product and method of the invention, it has been emphasized that the wavelength of the fluted ply A or the pitch on the grooved laminating roller should be no more that 3 mm in order to give the corrugated laminate the character of a flexible film rather than a board material. However, in connection with the description of the filter material, in which liquid or gas passes from holes in one ply to displaced holes in the other ply; and on the way passes a filler, it was nevertheless stated that for such purposes the wavelength may exceed the 3 mm. Similar is true for the described weatherprotective corrugated laminate, in which there also are displaced holes, but usually no filler, and the gravity force is used to "filter" the rainwater from the passing air.

Furthermore, the making of "first attenuated zones" and optionally also "second attenuated zones" has been explained as useful measures for obtaining the "miniflutes", be it in connection with longitudinally or transversely fluted laminates. Since these zones act as "hinges"—see e.g. FIG. 13—they enable for a given thickness of ply A a finer wavelength and/or deeper fluting then it otherwise could be achieved. In the foregoing there has also been stated other useful effects of the "fist attenuated zones" and the "second attenuated zones", and it is clear that similar advantages can be achieved when the wavelength of the product or the pitch of the grooved lamination roller exceeds 3 mm.

Therefore the product and the making of the "first attenuated zones" and optionally and "second attenuated zones" placed as it has been described in the foregoing, is considered an invention independently of the wavelength.

The invention claimed is:

1. A flexible laminate comprising:
a ply A comprising a uniaxially oriented or unbalanced biaxially oriented, mono-layered or multi-layered film including a waved flute configuration having a wavelength (λ) of no more than 1.5 mm and a ply A molecular orientation having a direction substantially parallel to a flute direction as determined by a shrinkage test, where each of the layers comprises a ply A flexible thermoplastic polymeric material, where the ply A flexible thermoplastic polymeric material is orientable at ambient temperature,
a ply B comprising a uniaxially oriented or unbalanced biaxially oriented, mono-layered or multi-layered film including a non-fluted configuration and a ply B molecular orientation, where each of the layers comprises a ply B flexible thermoplastic polymeric material and where a direction of the ply B molecular orientation forms an angle with the direction of the ply A molecular orientation, where the ply B flexible thermoplastic polymeric material is orientable at ambient temperature, and
adhesive bonds comprising bonding zones between some crests on the first side of the ply A and corresponding crest contact regions on the first side of the ply B either through co-extruded bonding layers on the first side of the ply A and the first side of the ply B or through a separately extruded lamination layer, where a thickness of the ply A within each bonding zone is substantially equal to a thickness of the ply A within adjacent unbonded regions of the flutes or the ply A includes first solid-state attenuated zones extending parallel to the flute direction and where each bonding zone is substantially located within a first solid-state attenuated zone.

2. The laminate of claim 1, wherein the adhesive bonds are formed through the separately extrusion lamination layer.

3. A laminate of claim 1, wherein the ply A includes first solid-state attenuation zones and each bonding zone is substantially located within a first attenuated zone.

4. The laminate according to claim 1, wherein the wavelength of the ply A is no more than 1 mm.

5. The laminate according to claim 1, wherein the wavelength of the ply A is no more than 0.8 mm.

6. The laminate according to claim 1, wherein a cross-section of the flutes has a substantially triangular shape, where ridges of the flutes are narrow solid-state attenuated regions.

7. The laminate according to claim 6, wherein the ridges are solid-state attenuated lines.

8. The laminate according to claim 1, wherein the flute direction extends substantially parallel to a machine direction of the lamination.

9. The laminate according to claim 1, wherein the flute direction extends substantially perpendicular to a machine direction of the lamination.

10. The laminate according to claim 1, wherein the ply A by the choice of polymer material or by an incorporated filler or by orientation, within the non-bonded zones exhibits an average yield tension parallel to the direction of fluting, which at an extension velocity of 500% $min^{-1}$, is no less than 30 $Nmm^{-2}$.

11. The laminate according to claim 1, wherein the wavelength of each flute including an adjacent bonding zone is no longer than 50 times the highest thickness of the ply A within the flute.

12. The laminate according to claim 1, wherein a width of each bonding zone is no less than 15% of the wavelength λ.

13. The laminate according to claim 1, wherein the width of the non-bonded zone of the ply A as measured between the two adjacent bonding zones and measured along its curved surfaces is no less than 10% longer than the corresponding linear distance.

14. The laminate according to claim 1, wherein a yield tension in the ply A in a direction parallel to the flutes and a yield tension in the ply B in a direction perpendicular to the flutes, both referring to the cross-section of the respective plies and determined in the non-bonded zones on narrow strips at an extension velocity of 500% $min^{-1}$, are no less than 30 $Nmm^{-2}$.

15. The laminate according to claim 1, wherein the ply B has a lower coefficient of elasticity than the ply A, both as measured in the direction perpendicular to the flute direction.

16. The laminate according to claim 1, wherein the choice of the ply B and of depth of fluting is so that by stretching the laminate perpendicular to the direction of the fluting up to a point where the waving has disappeared in the ply A, the ply B still has not undergone any significant plastic deformation, and where the ply B comprises a thermoplastic elastomer.

17. The laminate according to claim 1, wherein the ply A comprises at least two sub-films, each sub-film has a main direction of orientation and which are laminated so that the two directions cross each other.

18. The laminate according to claim 1, further comprising a non-waved monofilm formed or multifilm formed ply C of thermoplastic polymer material, the ply C being bonded to some of the crests of the ply A on a second side of the ply C through a surface bonding layers disposed on a second surface of the ply A and a corresponding first surface of the ply C.

19. The laminate according to claim 18, further comprising a monofilm formed or multifilm formed ply D comprising a thermoplastic, cold-orientable polymer material and having waved flute configuration, crests on one side of the ply D being bonded to a second side of the ply B through a surface bonding layers disposed on the second surface of the ply B and a first surface of the ply D, and where a wavelength of the flutes of the ply D is no more than 3 mm.

20. The laminated according to claim 1, wherein at least some of the flutes are flattened at intervals and bonded across each ones entire width at flattened locations to make the flute form a row of narrow closed elongated pockets.

21. The laminate accordingly to claim 20, wherein the flattened portions of a number of mutually adjacent flutes or of all flutes form a series of lines transverse to the longitudinal direction of the flutes.

22. The laminate according to claim 1, wherein the bonding of the crests on A, is effected through selected surface layers formed in a co-extrusion process.

23. The laminate according to claim 1, wherein the mono- or multifilm formed plies comprises a polyolefin.

24. The laminate according to claim 18, wherein the ply B and the ply C each has a main direction of orientation, either by being uniaxially oriented or unbalanced biaxially oriented, or by itself being a cross-laminate of uniaxially or unbalanced biaxially oriented films, the cross-laminate exhibiting a resultant main direction of orientation whereby the main direction of orientation in the ply B criss-crosses the main direction of orientation in the ply C.

25. The laminate according to claim 24, wherein the ply A in a non-oriented state exhibits a coefficient of elasticity E which is lower than a coefficient of elasticity E of both the ply B and the ply C in their non-oriented state.

26. The laminate according to claim 25, wherein the flutes are flattened at intervals and bonded across each ones entire width to form a row of narrow closed pockets.

27. The laminate according to claim 1, wherein by the choice of polymer material or by an incorporated filler or by orientation, the coefficient of elasticity E in the ply A measured in the non-bonded zone in the direction parallel to the flute as an average over the non-bonded zone is no less than 700 MPa.

28. The laminate according to claim 1, wherein at least some of channels formed by the flutes of the ply A and the matching non-waved ply B are closed to form pockets, where the pockets include a filling material.

29. The laminate according to claim 28, wherein the filling material is a preservative for goods intended to become packed in or protected by the laminate, an oxygen scavenger or ethylene scavenger, a biocide, a corrosion inhibitor or a fire extinguishing agent, optionally with perforations established in the flutes of the ply A or non-waved ply B to enhance the effect of the preservative.

30. The laminate according to claim 28, wherein the filling material comprises a reinforcement yarn, reinforcement filaments or reinforcement fibers.

31. The laminate according to claim 28, wherein the filling material is adapted to act as a filter material by holding back suspended particles from a liquid passing through the channels or pockets or is an absorbent or ion exchanger capable of absorbing or exchanging matter dissolved in such liquid, the filling material optionally being fibre-formed or yarn-formed, and that each tilled flute and matching non-waved film material is supplied with a row of perforations, whereby the perforations or groups of perforations in a flute and the perforations or groups of perforations in the matching non-waved film material are mutually displaced so as to force the liquid with the suspended particles, while passing from one surface of the laminate towards the other surface, to run through the filter material in a direction parallel to the longitudinal directions of the flutes.

32. A bag made from the laminate according to claim 1, wherein the laminate comprises only the two mono- or multifilm formed plies A and B, and in that a bottom and a top of the bag are generally perpendicular to the longitudinal direction of the flutes.

33. flexible packaging material according to claim 1.

34. A flexible cover sheet and material for tarpaulins according to claim 1.

35. A raincoat according to claim 1.

36. The laminate according to claim 1, wherein the ply A is unoriented states exhibits a coefficient of elasticity E which is lower than a coefficient of elasticity E exhibited by the ply B in unoriented state.

37. The laminate according to claim 19, is made to be weather resistant and air-permeable, wherein at least some of channels formed either by the waved ply A and the non-waved ply B and/or a non-waved ply C and/or a waved ply D are connected to the environment on both sides of the laminate through perforations, where the perforations on the two sides of a channel being mutually displaced so as to force air or water which pass through the laminate to run a distance through the channel.

38. The laminate according to claim 1, wherein there is print on the ply A and/or the ply B in the non-bonded zones, and where the bonded zones being substantially devoid of such print.

39. The laminate according to claim 1, wherein the ply A and/or the ply B is printed on the surface to become an inside of the laminate, the printing process being in register with the flute-forming and lamination processes so as to limit the print substantially to the non-bonded zones.

* * * * *